United States Patent
Park et al.

(10) Patent No.: US 12,301,506 B2
(45) Date of Patent: May 13, 2025

(54) METHOD AND DEVICE FOR CONTROL AND DATA INFORMATION TRANSMISSION IN WIRELESS COMMUNICATION SYSTEM

(71) Applicant: Samsung Electronics Co., Ltd., Suwon-si (KR)

(72) Inventors: Sungjin Park, Suwon-si (KR); Jinyoung Oh, Suwon-si (KR); Jeongho Yeo, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 17/778,719

(22) PCT Filed: Nov. 20, 2020

(86) PCT No.: PCT/KR2020/016475
§ 371 (c)(1),
(2) Date: May 20, 2022

(87) PCT Pub. No.: WO2021/101314
PCT Pub. Date: May 27, 2021

(65) Prior Publication Data
US 2023/0336312 A1    Oct. 19, 2023

(30) Foreign Application Priority Data
Nov. 22, 2019   (KR) ........................ 10-2019-0151192

(51) Int. Cl.
*H04L 5/00*    (2006.01)
*H04L 1/1812*    (2023.01)
(Continued)

(52) U.S. Cl.
CPC .......... *H04L 5/0055* (2013.01); *H04L 1/1812* (2013.01); *H04L 5/14* (2013.01); *H04W 72/1273* (2013.01); *H04W 72/232* (2023.01)

(58) Field of Classification Search
CPC ....... H04L 5/0055; H04L 1/1812; H04L 5/14; H04W 72/232; H04W 72/1273
See application file for complete search history.

(56) References Cited

U.S. PATENT DOCUMENTS

2015/0124725 A1* 5/2015 Oizumi ................ H04L 5/0055
                                                                        370/329
2015/0208386 A1  7/2015 Yang et al.
(Continued)

FOREIGN PATENT DOCUMENTS

KR    10-2019-0104985 A    9/2019
WO    2020/139050 A1    7/2020

OTHER PUBLICATIONS

Nokia, Nokia Shanghai Bell; On UCI Enhancements for NR URLLC; 3GPP TSG RAN WG1 #99; R1-1912512; Nov. 9, 2019, Reno, USA.
(Continued)

*Primary Examiner* — Jael M Ulysse
(74) *Attorney, Agent, or Firm* — Jefferson IP Law, LLP

(57) ABSTRACT

The present disclosure relates to a communication technique that combines a 5G communication system for supporting a higher data transmission rate than a 4G system with IoT technology, and a system therefor. The present disclosure may be applied to intelligent services (for example, smart homes, smart buildings, smart cities, smart cars or connected cars, healthcare, digital education, retail businesses, security and safety-related services, etc.) on the basis of 5G communication technology and IoT-related technology. Furthermore, the present disclosure provides a method and device for transmitting HARQ-ACK feedback for downlink data transmission. Specifically, disclosed are a method for con-
(Continued)

figuring HARQ-ACK feedback bits when a terminal intends to transmit multiple HARQ-ACKs within one slot through an uplink, and a device therefor.

12 Claims, 12 Drawing Sheets

(51) Int. Cl.
*H04L 5/14* (2006.01)
*H04W 72/1273* (2023.01)
*H04W 72/232* (2023.01)

(56) References Cited

U.S. PATENT DOCUMENTS

| | | | |
|---|---|---|---|
| 2015/0264678 A1* | 9/2015 | Yin | H04L 5/00 370/329 |
| 2016/0308653 A1* | 10/2016 | Dinan | H04W 52/0235 |
| 2016/0374082 A1* | 12/2016 | Nguyen | H04W 72/12 |
| 2017/0013565 A1* | 1/2017 | Pelletier | H04W 52/146 |
| 2017/0041923 A1* | 2/2017 | Park | H04L 5/0053 |
| 2019/0074935 A1* | 3/2019 | Babaei | H04L 1/1854 |
| 2019/0124558 A1* | 4/2019 | Ang | H04L 5/001 |
| 2019/0149305 A1* | 5/2019 | Zhou | H04L 5/0092 370/330 |
| 2019/0182870 A1* | 6/2019 | Shih | H04W 74/0833 |
| 2019/0222361 A1 | 7/2019 | Cheng et al. | |
| 2019/0289513 A1* | 9/2019 | Jeon | H04W 72/0453 |
| 2019/0306841 A1 | 10/2019 | Huang et al. | |
| 2020/0162207 A1 | 5/2020 | Hwang et al. | |
| 2020/0204312 A1* | 6/2020 | Xu | H04W 36/085 |
| 2020/0213981 A1 | 7/2020 | Park et al. | |
| 2021/0051650 A1* | 2/2021 | Yi | H04W 72/21 |
| 2022/0061077 A1* | 2/2022 | Choi | H04L 1/1864 |
| 2022/0140975 A1* | 5/2022 | Siomina | H04L 5/0051 370/329 |

OTHER PUBLICATIONS

NTT Docomo, Inc.; Discussions on DL SPS enhancement and UL intra-UE transmission prioritization/multiplexing; 3GPP TSG RAN WG1 #98; R1-1909199; Aug. 17, 2019, Prague, CZ.
Samsung; Enhancements on Multi-TRP/Panel Transmission; 3GPP TSG RAN WG1 Meeting #99 R1-1912482; Nov. 8, 2019, Reno, USA.
European Search Report dated Nov. 29, 2022, issued in European Application No. 20890990.3.
Ericsson, On multi-TRP and multi-panel, R1-1908990, 3GPP TSG RAN WG1 #98, Aug. 16, 2019, Prague, Czech Republic.
Korean Office Action dated Mar. 6, 2025, issued in Korean Application No. 10-2019-0151192.

* cited by examiner

METHOD AND DEVICE FOR CONTROL AND DATA INFORMATION TRANSMISSION IN WIRELESS COMMUNICATION SYSTEM

CROSS-REFERENCE TO RELATED APPLICATION(S)

This application is a U.S. National Stage application under 35 U.S.C. § 371 of an International application number PCT/KR2020/016475, filed on Nov. 20, 2020, which is based on and claimed priority of a Korean patent application number 10-2019-0151192, filed on Nov. 22, 2019, in the Korean Intellectual Property Office, the disclosure of which is incorporated by reference herein in its entirety.

TECHNICAL FIELD

The disclosure relates to a method and apparatus for transmitting control and data information in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system established by the 3rd generation partnership project (3GPP) is called a new radio (NR) system. The 5G communication system is considered to be implemented in extremely high frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques have been discussed and adopted in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

DISCLOSURE OF INVENTION

Technical Problem

The disclosure relates to a method and apparatus for transmitting control and data information in a wireless communication system.

Solution to Problem

A method of a terminal in a communication system according to an embodiment of the disclosure for solving the above-described technical problem may include receiving configuration information on a first cell and a second cell from a base station; receiving, from the base station, downlink control information (DCI) including resource allocation information of a plurality of physical downlink shared channels (PDSCHs) and information on a physical uplink control channel (PUCCH) resource for transmitting a hybrid automatic repeat request acknowledgment (HARQ-ACK) for the plurality of PDSCHs; receiving the plurality of PDSCHs related to the DCI; and transmitting the HARQ-ACK for the plurality of PDSCHs in one slot, based on the PUCCH resource of the first cell or the second cell.

According to an embodiment, transmitting the HARQ-ACK may include determining whether the PUCCH resource of the first cell is valid; and upon determining that the PUCCH resource of the first cell is not valid, transmitting the HARQ-ACK based on the PUCCH resource of the second cell.

According to an embodiment, when at least a part of the PUCCH resource of the first cell corresponds to a downlink symbol, the PUCCH resource of the first cell may be determined to be not valid.

According to an embodiment, the method may include receiving, from the base station, information indicating a cell index for transmitting the HARQ-ACK for the plurality of PDSCHs, and the HARQ-ACK for the plurality of PDSCHs may be transmitted based on the PUCCH resource of a cell corresponding to the indicated cell index.

According to an embodiment, the method may include receiving, from the base station, information indicating whether a cell for transmitting the HARQ-ACK is dynamically determinable, wherein when the information indicates that the cell is dynamically determinable, the HARQ-ACK for the plurality of PDSCHs may be transmitted based on the PUCCH resource of the first cell or the second cell, and when the information indicates that the cell is not dynamically determinable, the HARQ-ACK for the plurality of PDSCHs may be transmitted based on the PUCCH resource of one configured cell among the first cell and the second cell.

In addition, a method of a base station in a communication system according to an embodiment of the disclosure may include transmitting configuration information on a first cell and a second cell to a terminal; transmitting, to the terminal, downlink control information (DCI) including resource allocation information of a plurality of physical downlink shared channels (PDSCHs) and information on a physical uplink control channel (PUCCH) resource for transmitting a hybrid automatic repeat request acknowledgment (HARQ-ACK) for the plurality of PDSCHs; transmitting the plurality of PDSCHs related to the DCI; and receiving the HARQ-ACK for the plurality of PDSCHs in one slot, based on the PUCCH resource of the first cell or the second cell.

In addition, a terminal in a communication system according to an embodiment of the disclosure may include a transceiver and a controller. The controller may be configured to receive configuration information on a first cell and a second cell from a base station, to receive, from the base station, downlink control information (DCI) including resource allocation information of a plurality of physical downlink shared channels (PDSCHs) and information on a physical uplink control channel (PUCCH) resource for transmitting a hybrid automatic repeat request acknowledgment (HARQ-ACK) for the plurality of PDSCHs, to receive the plurality of PDSCHs related to the DCI, and to transmit the HARQ-ACK for the plurality of PDSCHs in one slot, based on the PUCCH resource of the first cell or the second cell.

In addition, a base station in a communication system according to an embodiment of the disclosure may include a transceiver and a controller. The controller may be configured to transmit configuration information on a first cell and a second cell to a terminal, to transmit, to the terminal, downlink control information (DCI) including resource allocation information of a plurality of physical downlink shared channels (PDSCHs) and information on a physical uplink control channel (PUCCH) resource for transmitting a hybrid automatic repeat request acknowledgment (HARQ-ACK) for the plurality of PDSCHs, to transmit the plurality of PDSCHs related to the DCI, and to receive the HARQ-ACK for the plurality of PDSCHs in one slot, based on the PUCCH resource of the first cell or the second cell.

Advantageous Effects of Invention

According to embodiments of the disclosure, the terminal can construct the HARQ-ACK codebook in a situation of performing transmission of one or more HARQ-ACKs in one slot. In addition, according to embodiments of the disclosure, the terminal can transmit the PUCCH in one slot in a carrier aggregation situation.

MODE FOR THE INVENTION

Figure 1:
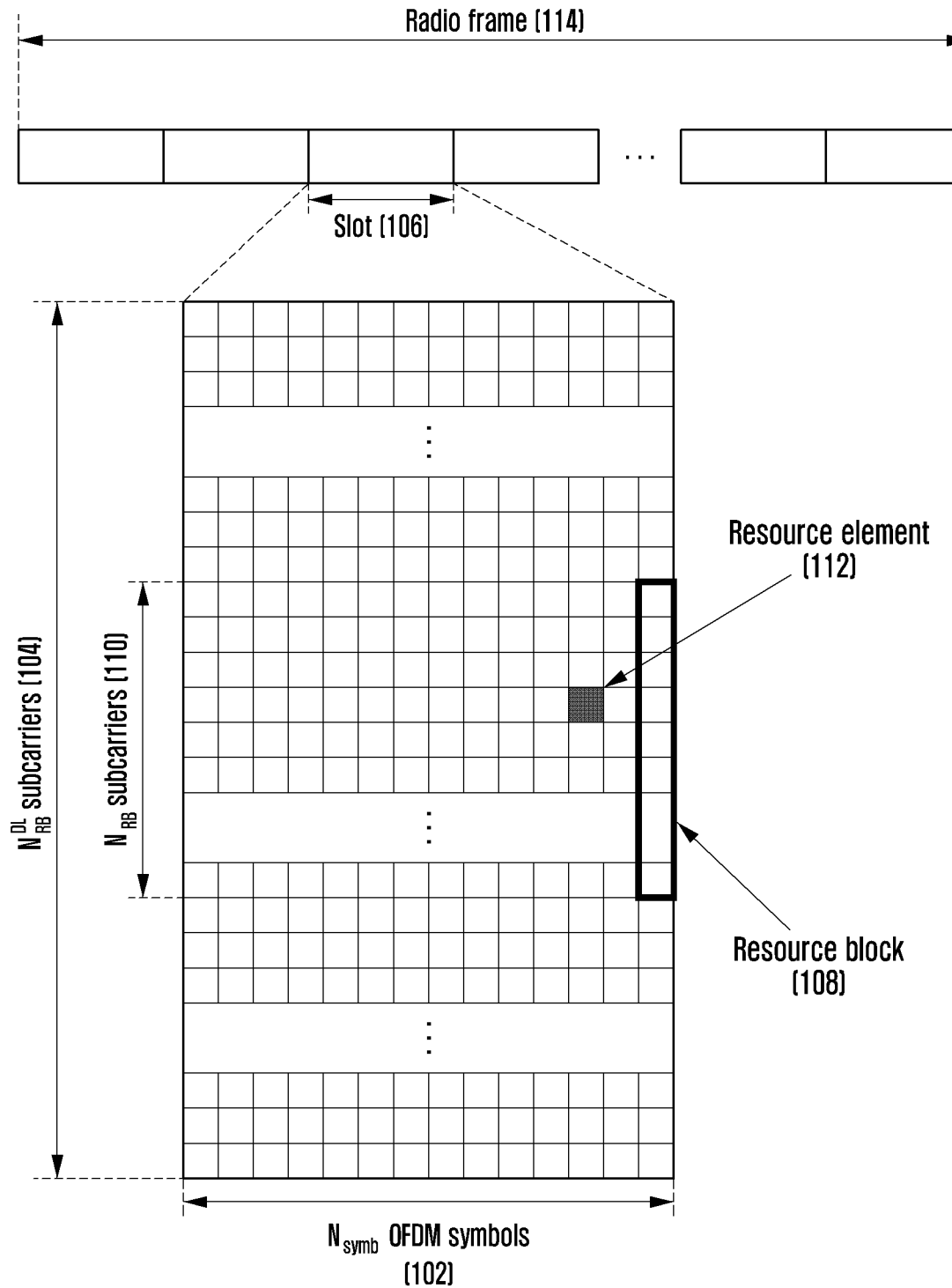
FIG. 1 is a diagram illustrating a transmission structure of a time-frequency domain which is a radio resource region of a 5G system or NR system according to an embodiment of the disclosure.

Hereinafter, embodiments will be described in detail with reference to the accompanying drawings.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card. Also, in embodiments, the unit may include one or more processors.

Outgrowing what provides an initial voice-oriented service, a wireless communication system is evolving to a broadband wireless communication system that provides a high-speed and high-quality packet data service, like communication standards such as, for example, 3GPP high speed packet access (HSPA), long term evolution (LTE) (or evolved universal terrestrial radio access (E-UTRA)), LTE-advanced (LTE-A), high rate packet data (HRPD) of 3GPP2, ultra-mobile broadband (UMB), and 802.16e of IEEE. In addition, a 5G or new radio (NR) communication standard is being made as a 5G wireless communication system.

As a representative example of the broadband wireless communication system, a 5G or NR system employs an orthogonal frequency division multiplexing (OFDM) scheme in a downlink (DL) and an uplink (UL). Specifically, a cyclic-prefix OFDM (CP-OFDM) scheme is employed in the downlink, and a discrete Fourier transform spreading OFDM (DFT-S-OFDM) scheme is employed together with the CP-OFDM in the uplink. The uplink refers to a radio link in which a terminal (user equipment (UE) or mobile station (MS)) transmits data or control signals to a base station (BS) (or gNode B), and the downlink refers to a radio link in which the base station transmits data or control signals to the terminal. This multiple access scheme generally allocates and operates time-frequency resources for carrying data or control information to be not overlapped for each user (that is, orthogonality is established), so that each user's data or control information can be distinguished.

The 5G or NR system employs a hybrid automatic repeat request (HARQ) scheme for retransmitting corresponding data in a physical layer when a decoding failure occurs in the initial transmission. In the HARQ scheme, when failing to correctly decode data, a receiver sends information (negative acknowledgment: NACK) indicating a decoding failure to a transmitter so that the transmitter can retransmit the data in the physical layer. The receiver may improve data reception performance by combining data retransmitted by the transmitter with data that has previously failed to be decoded. In addition, when correctly decoding data, the receiver sends information (acknowledgement: ACK) indicating a decoding success to the transmitter so that the transmitter can transmit new data.

Meanwhile, New Radio access technology (NR), which is a new 5G communication, is being designed to allow various services to be freely multiplexed in time and frequency resources. Thus, a signal waveform, numerology, reference signal, etc. may be dynamically or freely allocated according to the needs of the corresponding service. In order to provide an optimal service to a UE in wireless communication, it is important to optimize data transmission through measurement of channel quality and interference, and it is essential to measure an accurate channel status.

However, unlike the 4G communication where channel and interference characteristics do not change significantly depending on frequency resources, the 5G channel is subject to a great change in the channel and interference characteristics depending on the service, so it is necessary to support a subset of frequency resource group (FRG) dimension for measuring them separately. Meanwhile, in the 5G or NR system, the types of supported services may be divided into categories such as enhanced mobile broadband (eMBB), massive machine type communications (mMTC), and ultra-reliable and low-latency communications (URLLC). The eMBB is a service that aims for a high-speed transmission of high-capacity data, the mMTC is a service that aims for UE power minimization and connectivity of multiple UEs, and the URLLC is a service that aims for high reliability and low latency. Depending on the type of service applied to the UE, different requirements may be applied.

Among the above-described services, because the URLLC service aims for high reliability and low latency, there may be a need to transmit control information and data information transmittable through a physical channel at a low coding rate. In case of control information, the repeated transmission function of control information has already been introduced in the LTE's MTC or Narrow Band Internet-of-Things (NB-IoT) service. Because the purpose of this introduction was to provide high coverage for UEs having a small bandwidth, the latency time was not sufficiently considered. In addition, the minimum unit of control information repeated transmission is fixed in units of subframes based on LTE. In order to support the URLLC service in the NR system or 5G system, it is necessary to introduce a control information repeated transmission mode that can improve reliability while requiring a small latency time. Therefore, in the disclosure, a situation in which control information is repeatedly transmitted in a slot is basically considered. Additionally, a situation in which control information transmittable across a slot boundary is repeatedly transmitted is also considered. Through the operation provided in the disclosure, the UE is capable of detecting control information transmitted from the base station at a faster time with high reliability.

In the disclosure, terms are defined in consideration of respective functions and may vary according to a user's or operator's intention or custom. Therefore, the definition should be made based on the content throughout this specification. Hereinafter, a base station (BS) is a subject performing resource allocation of a UE and may be at least one of a gNode B (gNB), an eNode B (eNB), a Node B, a radio access unit, a base station controller, or a node on the network. A terminal may include a user equipment (UE), a mobile station (MS), a cellular phone, a smart phone, a computer, or a multimedia system capable of performing a communication function. In the disclosure, a downlink (DL) refer to a wireless transmission path of a signal transmitted from the base station to the UE, and an uplink (UL) refer to a wireless transmission path of a signal transmitted from the UE to the base station. In addition, although the disclosure will be described hereinafter based on the NR system, embodiments of the disclosure may also be applied to various communication system having a similar technical background or channel type. In addition, embodiments of the disclosure may be applied to any other communication system through some modifications within a range that does not significantly depart from the scope of the disclosure as being apparent to a person skilled in the art.

In the disclosure, typical terms of a physical channel and a signal may be used interchangeably with data or a control signal. For example, although a physical downlink shared channel (PDSCH) is a physical channel through which data is transmitted, the PDSCH may be referred to as data in the disclosure.

In the disclosure, higher signaling refers to a signal transmission method from the base station to the UE using a downlink data channel of a physical layer or from the UE to the base station using an uplink data channel of a physical layer, and may also be referred to as radio resource control (RRC) signaling or a medium access control (MAC) control element (CE).

Meanwhile, as research on a next-generation communication system is in progress, various schemes for scheduling communication with the UE are being discussed. Thus, there is a need for schemes of efficient scheduling and data transmission/reception in consideration of the characteristics of the next-generation communication system. Accordingly, in order to provide a plurality of services to the user in the communication system, a method and apparatus capable of providing the respective services within the same time interval to be suited for the characteristics of the corresponding services are required.

The NR system employs a hybrid automatic repeat request (HARQ) scheme for retransmitting corresponding data in a physical layer when a decoding failure occurs in the initial transmission. In the HARQ scheme, when failing to correctly decode data, a receiver sends information (negative acknowledgment: NACK) indicating a decoding failure to a transmitter so that the transmitter can retransmit the data in the physical layer. The receiver may improve data reception performance by combining data retransmitted by the transmitter with data that has previously failed to be decoded. In addition, when correctly decoding data, the receiver sends information (acknowledgement: ACK) indicating a decoding success to the transmitter so that transmitter can transmit new data.

Hereinafter, a method and apparatus for transmitting HARQ-ACK feedback in response to downlink data transmission will be described in the disclosure. Specifically, a method of constructing HARQ-ACK feedback bits when the UE intends to transmit multiple HARQ-ACKs in one slot through uplink will be described.

In the wireless communication system, especially, the New Radio (NR) system, the base station may configure one component carrier (CC) or a plurality of CCs for downlink transmission to the UE. In addition, downlink transmission and uplink transmission slots and symbols may be configured in each CC.

Meanwhile, when a physical downlink shared channel (PDSCH), which is downlink data, is scheduled, at least one of slot timing information on PDSCH mapping, position information on a start symbol of PDSCH mapping in the corresponding slot, and information on the number of symbols mapped by the PDSCH may be transmitted through a specific bit field of downlink control information (DCI). For example, when the DCI scheduling the PDSCH is transmitted in slot n, and if K0 which is slot timing information on PDSCH transmission indicates 0, a start symbol position is 0, and a symbol length is 7, the corresponding PDSCH is mapped to seven symbols from the symbol 0 in the slot n and transmitted.

Meanwhile, after K1 slot from transmission of PDSCH which is a downlink data signal, the HARQ-ACK feedback may be transmitted from the UE to the base station. K1 information which is timing information on HARQ-ACK transmission may be transmitted through the DCI. According to an embodiment, a candidate set of possible K1 values may be delivered via higher signaling, and the DCI may indicate one of them.

When the UE is configured with a semi-static HARQ-ACK codebook, the UE may determine the feedback bit (or HARQ-ACK codebook size) to be transmitted, based on a table including at least one of slot information K0, start symbol information, the number of symbols, and length information, in relation to PDSCH mapping, and based on K1 candidate values of HARQ-ACK feedback timing information for PDSCH. The table including at least one of slot information, start symbol information, the number of symbols, and length information, in relation to PDSCH mapping, may have default values or may be configured in the UE by the base station.

If the UE is configured with a dynamic HARQ-ACK codebook, the UE may determine the HARQ-ACK feedback bit (or HARQ-ACK codebook size) to be transmitted by the UE, based on downlink assignment indicator (DAI) information included in the DCI in a slot for transmission of HARQ-ACK information determined according to slot information K0 on PDSCH mapping and HARQ-ACK feedback timing information K1 value for PDSCH.

According to embodiments of the disclosure, a method and apparatus for constructing a HARQ-ACK codebook in a situation where a UE performs one or more HARQ-ACK transmissions in one slot are disclosed.

In addition, hereinafter, a method and apparatus for transmitting HARQ-ACK feedback for downlink data transmission in a carrier aggregation (CA) environment are described.

In 3GPP LTE Rel-10, a bandwidth extension technology has been adopted to support a larger amount of data transmission compared to LTE Rel-8. This technology, called bandwidth extension or carrier aggregation (CA), extends a band and thereby increases the amount of data transmission by the extended band compared to LTE Rel-8 UE that transmit data in one band. Each of the above bands is called a component carrier (CC), and the LTE Rel-8 UE is defined to have one CC for each of downlink and uplink. In addition, the downlink CC and the uplink CC connected via SIB-2 are collectively called a cell. The SIB-2 connection relationship between the downlink CC and the uplink CC is transmitted via a system signal or a higher signal. The UE that supports the CA may receive downlink data and transmit uplink data, through a plurality of serving cells.

In the Rel-10, when it is difficult for the base station to send a physical downlink control channel (PDCCH) to a specific UE in a specific serving cell, the base station may configure a carrier indicator field (CIF) as a field for notifying that the PDCCH is transmitted in another serving cell and the corresponding PDCCH indicates a physical downlink shared channel (PDSCH) or physical uplink shared channel (PUSCH) of another serving cell. The CIF may be configured for the UE supporting the CA. The CIF has been defined to indicate another serving cell by adding 3 bits to PDCCH information in a specific serving cell. The CIF is included only in case of cross-carrier scheduling, and if the CIF is not included, the cross-carrier scheduling may not be performed. When the CIF is included in downlink assignment information (DL assignment), the CIF indicates a serving cell in which the PDSCH scheduled by the DL assignment will be transmitted. When the CIF is included in uplink resource assignment information (UL grant), the CIF may be defined to indicate a serving cell in which the PUSCH scheduled by the UL grant will be transmitted.

As described above, in the Rel-10, the carrier aggregation (CA) which is a bandwidth extension technique is defined, and a plurality of serving cells may be configured for the UE. In addition, for data scheduling of the base station, the UE may periodically or aperiodically transmit channel information on the plurality of serving cells to the base station. The base station schedules and transmits data for each carrier, and the UE transmits A/N feedback for the data transmitted for each carrier. The LTE Rel-10 has been designed to transmit the A/N feedback of up to 21 bits. When the transmission of A/N feedback and channel information overlap with each other in one subframe, it has been designed to transmit the A/N feedback and discard the channel information. In the LTE Rel-11, it has been designed to multiplex the channel information of one cell together with the A/N feedback and transmit the A/N feedback of up to 22 bits and the channel information of one cell in a transmission resource of PUCCH format 3.

Meanwhile, in the LTE-13, a scenario of configuring up to 32 serving cells is assumed, and the concept of extending the number of serving cells to a maximum of 32 using an unlicensed band as well as a licensed band is being discussed. In this case, there is a risk that the transmission of channel information for a plurality of serving cells in one subframe may collide with each other, and a new PUCCH format is being designed to be able to transmit a plurality of channel information or A/N feedback at once. Thus, a method is required to support a UE operation when multiplexing channel information or A/N feedback for as many serving cells as possible in one subframe under various conditions. That is, a need arises for a method in which the UE determines a transmission operation and transmission resource of channel information or A/N feedback to be transmitted, and transmits the channel information and A/N feedbacks alone or in combination by using the transmission format mapped to the transmission resource, in a situation of considering a condition such as the number of serving cells configured for the UE, the type of PUCCH format configured for the UE, simultaneous transmission or not of PUCCH and PUSCH configured for the UE, or PUCCH transmission in a secondary cell other than a primary cell configured for the UE.

The carrier aggregation in the 5G NR has the same most operational functions as those of the carrier aggregation applied in the LTE, but there are different parts in terms of PUCCH transmission. For example, in the LTE, the PUCCH format is determined depending on whether UCI to be transmitted via PUCCH is SR, HARQ-ACK, CSI, or combined information, whereas, in the NR, the PUCCH format is determined depending on the number of UCI bits regardless of SR, HARQ-ACK, or CSI. Specifically, the PUCCH format is determined depending on a time resource length (number of symbols) of PUCCH and the number of UCI bits.

The component carriers supported for the carrier aggregation may exist in the same frequency band or in different frequency bands, and there are three carrier aggregation scenarios as follows.

1. Intraband aggregation with frequency-contiguous component carriers
2. Intraband aggregation with non-contiguous component carriers
3. Interband aggregation with non-contiguous component carriers Although the structures according to the above scenarios are all the same, the degree of RF complexity may vary according to individual scenarios. Unlike the LTE, the NR supports up to 16 carriers, and supports different frequency bandwidth sizes and a duplex mode. The maximum size of one carrier is about 400 MHz in the NR, and if all 16 carriers have this size, a bandwidth of up to 6.4 GHz can be supported theoretically through the carrier aggregation. The UE supporting the carrier aggregation in the same way as in the LTE may support simultaneous reception or transmission for two or more carriers. In the third scenario among the above scenarios, it may be possible to have different TDD configurations for respective carriers. Because of having different frequency bands, different carriers do not need to have the same transmission direction. Thus, unlike the UE that does not support the carrier aggregation, the UE that supports the carrier aggregation may require a duplex filter to handle the above situation. In the 3GPP standard, the carrier aggregation can be described through the term cell. Accordingly, the UE supporting the carrier aggregation can transmit and receive information with multiple cells. One of these cells is referred to as a primary cell (PCell) and means a cell that the UE initially finds and connects to. After that, secondary cells (Scells) may be configured via a higher signal and activated or deactivated via MAC CE or RRC. For example, a bitmap of the MAC CE may indicate the activation or deactivation of secondary cells configured through a higher layer. Also, the number of downlink cells and the number of uplink cells may be equal to or different from each other, and in other cases the number of downlink cells may be generally greater than the number of uplink cells.

In the 5G or NR system, it can operate in a wider channel bandwidth than the LTE channel bandwidth presented in Table A. Table B shows a corresponding relationship among a system transmission bandwidth, a channel bandwidth, and a subcarrier spacing (SCS) in the 5G or NR system.

TABLE B

| SCS | Channel bandwidth $BW_{channel}$ [MHz] | | | | | | | | | |
|---|---|---|---|---|---|---|---|---|---|---|
| [kHz] | 5 | 10 | 15 | 20 | 25 | 40 | 50 | 60 | 80 | 100 |
| Maximum transmission bandwidth $N_{RB}$ | | | | | | | | | | |
| 15 | 25 | 52 | 79 | 106 | 133 | 216 | 270 | NA | NA | NA |
| 30 | 11 | 24 | 38 | 51 | 65 | 106 | 133 | 162 | 217 | 273 |
| 60 | NA | 11 | 18 | 24 | 31 | 51 | 65 | 79 | 107 | 135 |

According to embodiments of the disclosure, a method and apparatus for a UE to transmit a PUCCH in one slot in a carrier aggregation situation are disclosed.

FIG. 1 is a diagram illustrating a transmission structure of a time-frequency domain which is a radio resource region of a 5G system or NR system according to an embodiment of the disclosure.

With reference to FIG. 1, in the radio resource region, the horizontal axis represents the time domain, and the vertical axis represents the frequency domain. The minimum transmission unit in the time domain is an OFDM symbol, and $N_{symb}$ OFDM symbols 102 constitute one slot 106. The length of a subframe is defined as 1.0 ms, and a radio frame 114 is defined as 10 ms. The minimum transmission unit in the frequency domain is a subcarrier, and the bandwidth of the entire system transmission band is composed of $N_{BW}$ subcarriers 104. However, these specific values may be variably applied depending on the system.

A basic unit of a resource in the time-frequency domain is a resource element (RE) 112, which may be represented with an OFDM symbol index and a subcarrier index. A resource block (RB) 108 or physical resource block (PRB) is defined as consecutive $N_{symb}$ OFDM symbols 102 in the time domain and consecutive $N_{RB}$ subcarriers 110 in the frequency domain. Therefore, one RB 108 is composed of $N_{symb} \times N_{RB}$ number of REs 112.

In general, the minimum transmission unit of data is an RB unit. In the 5G or NR system, $N_{symb}$ is 14, $N_{RB}$ is 12, and $N_{BW}$ and $N_{RB}$ may be proportional to the bandwidth of the system transmission band. Also, a data rate increases in proportion to the number of RBs scheduled for a UE. In the 5G or NR system, in case of the FDD system that divides downlink and uplink by frequency, a downlink transmission bandwidth and an uplink transmission bandwidth may be different from each other. A channel bandwidth may represent an RF bandwidth corresponding to the system transmission bandwidth. Table A below shows a corresponding relationship between a system transmission bandwidth and a channel bandwidth defined in the LTE system, which is the 4G wireless communication before the 5G or NR system. For example, the LTE system having a 10 MHz channel bandwidth may be configured with a transmission bandwidth of 50 RBs.

TABLE A

| Channel bandwidth $BW_{channel}$ [MHz] | 1.4 | 3 | 5 | 10 | 15 | 20 |
|---|---|---|---|---|---|---|
| Transmission bandwidth configuration NRB | 6 | 15 | 25 | 50 | 75 | 100 |

In the 5G or NR system, scheduling information for downlink data or uplink data is delivered from a base station to a UE through downlink control information (DCI). The DCI is defined according to various formats and, based on each format, may indicate whether it is scheduling information (UL grant) for uplink data or scheduling information (DL grant) for downlink data, whether it is a compact DCI with a small size of control information, whether spatial multiplexing using multiple antennas is applied, whether it is DCI for power control, and the like. For example, DCI format 1-1, which is scheduling control information (DL grant) for downlink data, may include at least one of the following types of control information.

Carrier indicator: This indicates a frequency carrier where transmission is performed.

DCI format indicator: This is an indicator for distinguishing whether the corresponding DCI is for downlink or uplink.

Bandwidth part (BWP) indicator: This indicates a BWP where transmission is performed.

Frequency domain resource allocation: This indicates an RB in the frequency domain allocated for data transmission. A resource to be expressed is determined according to the system bandwidth and the resource allocation scheme.

Time domain resource allocation: This indicates an OFDM symbol and a slot to be used for transmission of a data-related channel.

VRB-to-PRB mapping: This indicates a mapping scheme between a virtual RB (VRB) index and a physical RB (PRB) index.

Modulation and coding scheme (MCS): This indicates a modulation scheme and a coding rate used for data transmission. That is, this may indicate information about quadrature phase shift keying (QPSK), 16 quadrature amplitude modulation (16QAM), 64QAM, or 256QAM, and a coding rate value that informs a transport block size (TBS) and channel coding information.

Code block group (CBG) transmission information: This indicates information about a CBG transmitted when CBG retransmission is configured.

HARQ process number: This indicates the process number of HARQ.

New data indicator: This indicates whether HARQ initial transmission or retransmission.

Redundancy version: This indicates a redundancy version of HARQ.

Transmit power control (TPC) command for physical uplink control channel (PUCCH): This indicates a transmit power control command for PUCCH which is an uplink control channel.

In case of PUSCH transmission, time domain resource assignment may be transmitted via information on a slot for PUSCH transmission, a start symbol position S in that slot, and the number of symbols L to which PUSCH is mapped. Here, S may be a relative position from the start of the slot, L may be the number of consecutive symbols, and S and L may be determined from a start and length indicator value (SLIV) defined as follows.

```
If (L−1) ≤ 7 then
    SLIV = 14(L−1)+S
else
    SLIV = 14(14−L+1)+(14−1−S)
    where 0 < L ≤ 14−S
```

In the 5G or NR system, generally through RRC configuration, a table including, in one row, information about a SLIV value, a PUSCH mapping type, and a slot for PUSCH transmission may be configured. Then, in time domain resource allocation of DCI, an index value in the configured table is indicated so that the base station can transmit to the UE the information about a SLIV value, a PUSCH mapping type, and a slot for PUSCH transmission.

In the 5G or NR system, the PUSCH mapping type is defined as type A and type B. In PUSCH mapping type A, the first symbol among demodulation reference signal (DMRS) symbols may be located in the second or third OFDM symbol in the slot. In the PUSCH mapping type B, the first symbol among DMRS symbols may be located in the first OFDM symbol in the time domain resource allocated for PUSCH transmission. This method of PUSCH time domain resource allocation may be equally applicable to PDSCH time domain resource allocation.

The DCI may be transmitted on a physical downlink control channel (PDCCH) (or control information, hereinafter used interchangeably) after a channel coding and modulation process.

In general, the DCI is scrambled with a specific radio network temporary identifier (RNTI) (or UE identifier) independently for each UE, adds a cyclic redundancy check (CRC), is channel-coded, is configured as each independent PDCCH, and is transmitted. The PDCCH is mapped and transmitted in a control resource set (CORESET) configured for the UE.

Downlink data may be transmitted on a physical downlink shared channel (PDSCH), which is a physical channel for downlink data transmission. The PDSCH may be transmitted after a control channel transmission interval, and scheduling information such as a specific mapping position in the frequency domain and a modulation scheme is determined based on the DCI transmitted through the PDCCH.

Through the MCS among control information types constituting the DCI, the base station may notify the UE of a modulation scheme applied to the PDSCH to be transmitted and the size (transport block size, TBS) of data to be transmitted. In an embodiment, the MCS may consist of 5 bits or more or fewer bits. The TBS corresponds to the size before the channel coding for error correction is applied to data (transport block, TB) to be transmitted by the base station.

In the disclosure, the transport block (TB) may include a medium access control (MAC) header, a MAC control element (CE), one or more MAC service data units (SDUs), and padding bits. Alternatively, the TB may indicate a data unit or MAC protocol data unit (PDU) that is delivered from the MAC layer to the physical layer.

The modulation schemes supported in the NR system are quadrature phase shift keying (QPSK), 16 quadrature amplitude modulation (16QAM), 64QAM, and 256QAM, and each modulation order (Qm) corresponds to 2, 4, 6, or 8. That is, 2 bits per symbol may be transmitted in case of QPSK modulation, 4 bits per symbol in case of 16QAM modulation, 6 bits per symbol in case of 64QAM modulation, and 8 bits per symbol in case of 256QAM modulation.

In the 5G or NR system, when the UE receives a PDSCH or PUSCH schedule via DCI, and in case that the time resource allocation field index included in the DCI indicates m, this indicates a combination of DRMS Type A position information corresponding to m+1, PDSCH mapping type information, a slot index $K_0$, a data resource start symbol S, and a data resource allocation length L in the table indicating time domain resource allocation information. For example, Table 1 includes time domain resource allocation information.

TABLE 1

PDSCH time domain resource allocation based on normal cyclic prefix

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type B | 0 | 1 | 13 |
| 13 | 2, 3 | Type B | 0 | 1 | 6 |
| 14 | 2, 3 | Type B | 0 | 2 | 4 |
| 15 | 2, 3 | Type B | 0 | 4 | 7 |
| 16 | 2, 3 | Type B | 0 | 8 | 4 |

In Table 1, dmrs-TypeA-Position is a field indicating the symbol position at which DMRS is transmitted in one slot indicated by system information block (SIB) which is one of UE common control information. A possible value for this field is 2 or 3. When the number of symbols constituting one slot is 14 in total and the first symbol index is 0, 2 denotes the third symbol and 3 denotes the fourth symbol.

In Table 1, the PDSCH mapping type is information indicating the location of DMRS in the scheduled data resource region. In case of PDSCH mapping type A, the DMRS is always transmitted and received at the symbol position determined in dmrs-TypeA-Position regardless of a time domain resource of allocated data.

In case of PDSCH mapping type B, the DMRS is always transmitted and received in the first symbol among time domain resources of allocated data. In other words, the PDSCH mapping type B does not use dmrs-TypeA-Position information.

In Table 1, $K_0$ denotes an offset between a slot index to which a PDCCH for DCI transmission belongs and a slot index to which a PDSCH or PUSCH scheduled in the DCI belongs. For example, when the slot index of the PDCCH is n, the slot index of the PDSCH or PUSCH scheduled in the DCI of the PDCCH is $n+K_0$.

In Table 1, S denotes a start symbol index of a data time domain resource within one slot. The range of possible values of S is 0 to 13 based on the normal cyclic prefix.

In Table 1, L denotes the length of a data time domain resource interval within one slot. The range of possible values of L is 1 to 14. However, possible values of S and L are determined by the following Equation 1 and Table 2 or Table 3. Table 1 may be values used as default by the UE before receiving time resource allocation information through UE-specific or UE-common higher signaling. For example, DCI format 0_0 or 1_0 may always use Table 1 as a default time resource region value.

Table 1 shows PDSCH time domain resource allocation values, and for PUSCH time domain resource allocation, the $K_0$ value is replaced with the K2 value. Table 1-1 below is an example of a PUSCH time domain resource allocation table.

TABLE 1-1

PDSCH time domain resource allocation based on normal cyclic prefix

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

Equation 1 if $(L - 1) \leq 7$ then $SLIV = 14 \cdot (L - 1) + S$ else $SLIV = 14 \cdot (14 - L + 1) + (14 - 1 - S)$ where $0 < L \leq 14 - S$.

Table 2 below shows possible combinations of S and L according to whether the cyclic prefix is normal or extended and whether the PDSCH mapping type is type A or type B.

TABLE 2

PDSCH time domain resource allocable combination of S and L

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, ..., 14} | {3, ..., 14} | {0, 1, 2, 3} (Note 1) | {3, ..., 12} | {3, ..., 12} |
| Type B | {0, ..., 12} | {2, 4, 7} | {2, ..., 14} | {0, ..., 10} | {2, 4, 6} | {2, ..., 12} |

(Note 1):
S = 3 is applicable only if dmrs – TypeA – Position = 3

Table 3 below shows possible combinations of S and L according to whether the cyclic prefix is normal or extended and whether the PUSCH mapping type is type A or type B.

TABLE 3

PUSCH time domain resource allocable combination of S and L

| PUSCH mapping type | Normal cyclic prefix | | | Extended cyclic prefix | | |
|---|---|---|---|---|---|---|
| | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 12} | {1, ..., 12} | {1, ..., 12} |

In Table 1, each index may be configured through a higher signaling parameter PDSCH-TimeDomainResourceAllocationList or PUSCH-TimeDomainResourceAllocationList.

PDSCH-TimeDomainResourceAllocationList consists of one or more higher signaling parameters PDSCH-TimeDomainResourceAllocation, and there are k0, mappingtype, and startSymbolAndLength in PDSCH-TimeDomainResourceAllocation. The possible value range of k0 is 0 to 32. Mappingtype may correspond to type A or type B. The possible value range of StartSymbolAndLength is 0 to 127. As described above, when the mappingtype is type A, the symbol position of DMRS follows the value indicated by dmrs-typeA-Position.

PUSCH-TimeDomainResourceAllocationList consists of one or more higher signaling parameters PUSCH-TimeDomainResourceAllocation, and there are k2, mapping type, and startSymbolAndLength in PUSCH-TimeDomainResourceAllocation. The possible value range of k2 is 0 to 32. Mappingtype may correspond to type A or type B. The possible value range of StartSymbolAndLength is 0 to 127. As described above, when the mappingtype is type A, the symbol position of DMRS follows the value indicated by dmrs-typeA-Position.

The above-described PDSCH-TimeDomainResourceAllocation or PUSCH-TimeDomainResourceAllocation is a method of allocating time domain resources for PDSCH or PUSCH within one slot. The higher signaling aggregationFactorDL denotes the number of slots in which the PDSCH-TimeDomainResourceAllocation value applied in one slot is repeatedly transmitted. The higher signaling aggregationFactorUL denotes the number of slots in which the PUSCH-TimeDomainResourceAllocation value applied in one slot is repeatedly transmitted. The possible value range of aggregationFactorDL and aggregationFactorUL is {1, 2, 4, 8}. For example, when aggregationFactorDL is 8, it means that one of possible PDSCH-TimeDomainResourceAllocation values is repeatedly transmitted over a total of 8 slots. However, when at least some of the symbols applied to PDSCH-TimeDomainResourceAllocation in a specific slot are uplink symbols, PDSCH transmission/reception in that slot is omitted. Similarly, when at least some of the symbols applied to PUSCH-TimeDomainResourceAllocation in a specific slot are downlink symbols, PUSCH transmission/reception in that slot is omitted.

Figure 2:
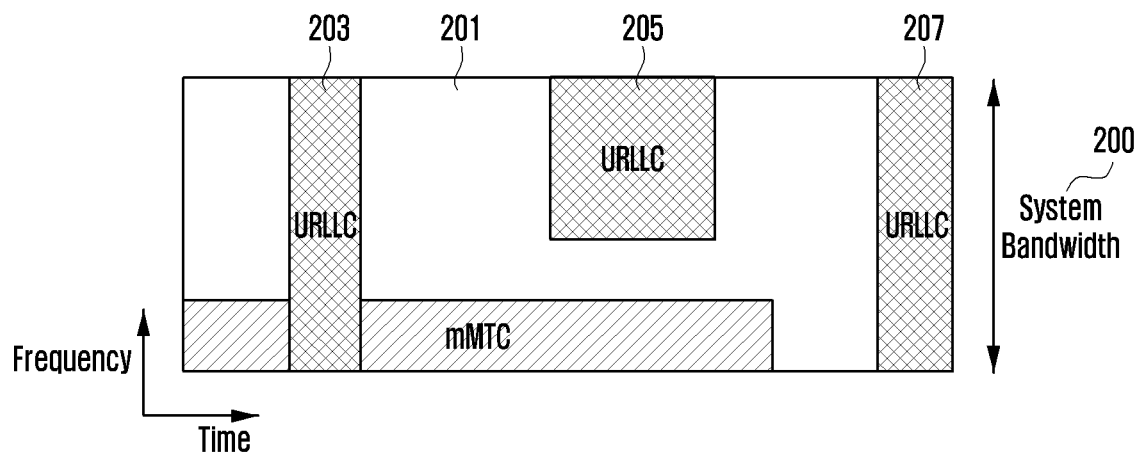
FIG. 2 is a diagram illustrating a method for allocating data for eMBB, URLLC, and mMTC in a time-frequency resource domain in a 5G system or NR system according to an embodiment of the disclosure.

FIG. 2 is a diagram illustrating a method for allocating data for eMBB, URLLC, and mMTC in a time-frequency resource domain in a 5G system or NR system according to an embodiment of the disclosure.

With reference to FIG. 2, in the entire system frequency band 200, data for eMBB, URLLC, and mMTC may be allocated. In case that the transmission of URLLC data 203, 205, or 207 is needed while eMBB 201 and mMTC 209 are allocated and transmitted in a specific frequency band, the URLLC data 203, 205, or 207 may be transmitted by emptying a part to which the eMBB 201 and the mMTC 209 have been already allocated, or not transmitting them.

Because a URLLC service among the above-mentioned services needs to reduce a latency time, the URLLC data may be allocated to and transmitted in a part of resources to which the eMBB or the mMTC is allocated.

In case that the URLLC is additionally allocated to and transmitted in the resource to which the eMBB is allocated, eMBB data may not be transmitted in the overlapped frequency-time resource, and therefore the transmission performance of the eMBB data may be lowered. That is, a failure in the eMBB data transmission may occur due to the URLLC allocation.

Figure 3:
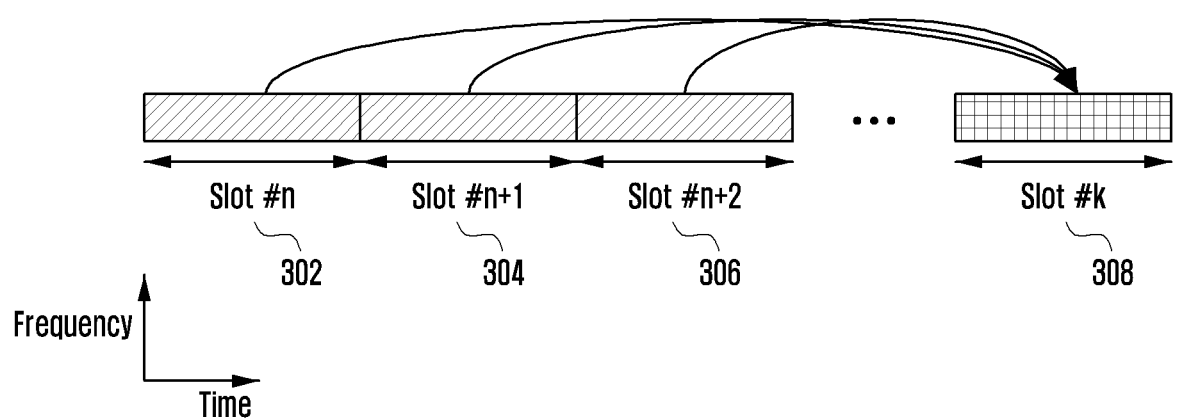
FIG. 3 is a diagram illustrating a method for configuring a semi-static HARQ-ACK codebook in an NR system according to an embodiment of the disclosure.

FIG. 3 is a diagram illustrating a method for configuring a semi-static HARQ-ACK codebook in an NR system according to an embodiment of the disclosure.

When the UE receives a semi-static HARQ-ACK codebook through a higher layer in a situation where a HARQ-ACK PUCCH that the UE can transmit in one slot is limited to one, the UE reports HARQ-ACK information for PDSCH reception or SPS PDSCH release, within the HARQ-ACK codebook, in a slot indicated by the value of a PDSCH-to-HARQ_feedback timing indicator in DCI format 1_0 or DCI format 1_1.

The UE reports a HARQ-ACK information bit value through NACK, within the HARQ-ACK codebook, in a slot not indicated by the PDSCH-to-HARQ_feedback timing indicator field in DCI format 1_0 or DCI format 1_1.

When the set of PDSCH reception candidate cases in the serving cell c is $M_{A,c}$, and if the UE reports only HARQ-ACK information for one SPS PDSCH release or one PDSCH reception among $M_{A,c}$ cases for candidate PDSCH reception, and the corresponding one SPS PDSCH release or one PDSCH is scheduled by DCI format 1_0 including information indicating the counter DACI field being 1 in the Pcell, the UE may determine and report one HARQ-ACK codebook for the corresponding SPS PDSCH release or PDSCH reception.

The other cases follows a HARQ-ACK codebook determination method described hereinafter.

$M_{A,c}$ can be obtained through steps according to the following [pseudo-code 1].

---

[Start of pseudo-code 1]
- Step 1: Initialize j to 0 and $M_{A,c}$ to the empty set. Initialize k, which is the HARQ-ACK transmission timing index, to 0.
- Step 2: Configure R as the set of rows in a table including slot information, start symbol information, the number of symbols, or length information, related to PDSCH mapping. If the PDSCH-capable mapping symbol indicated by each value of R is configured as the UL symbol in accordance with the DL and UL configuration via higher level, delete the corresponding row from R.
- Step 3-1: If the UE can receive one PDSCH for unicast in one slot and R is not an empty set, add one to the set $M_{A,c}$.
- Step 3-2: If the UE can receive more than one PDSCH for unicast in one slot, count the number of PDSCHs that can be assigned to different symbols in the calculated R, and add the corresponding number to $M_{A,c}$.
- Step 4: Restart from Step 2 by increasing k by 1.
[End of pseudo-code 1]

---

With reference to FIG. 3 for the above-described pseudo-code 1, in order to perform HARQ-ACK PUCCH transmission in slot #k 308, all slot candidates capable of PDSCH-to-HARQ ACK timing that can indicate the slot #k 308 are considered.

In FIG. 3, it is assumed that HARQ-ACK transmission is possible in the slot #k 308 by a PDSCH-to-HARQ-ACK timing combination of only PDSCHs scheduled in slot #n 302, slot #n+1 304, and slot #n+2 306. In addition, the maximum number of schedulable PDSCHs for each slot is derived in consideration of time domain resource configuration information of PDSCH schedulable in each of the slots 302, 304, and 306 and information indicating whether a symbol in the slot is downlink or uplink.

For example, if the maximum scheduling is possible for two PDSCHs in the slot 302, three PDSCHs in the slot 304, and two PDSCHs in the slot 306, the maximum number of PDSCHs included in the HARQ-ACK codebook transmitted in the slot 308 is 7 in total. This is called cardinality of the HARQ-ACK codebook.

Figure 4:
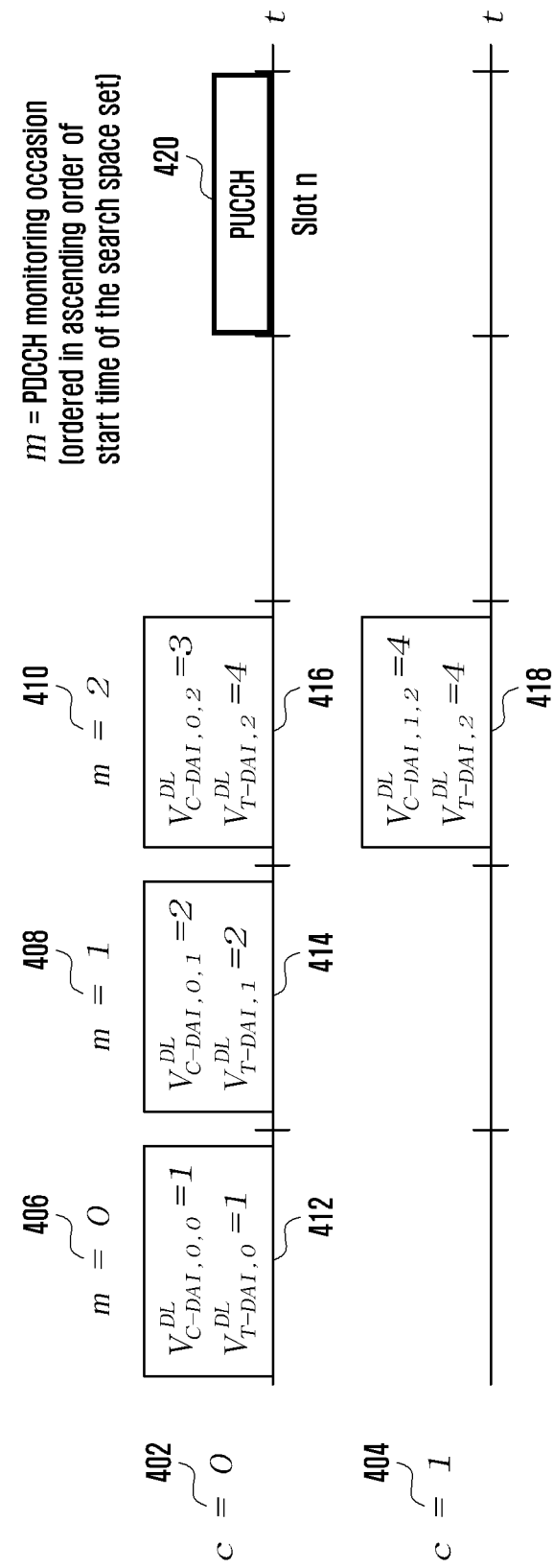
FIG. 4 is a diagram illustrating a method for configuring a dynamic HARQ-ACK codebook in an NR system according to an embodiment of the disclosure.

FIG. 4 is a diagram illustrating a method for configuring a dynamic HARQ-ACK codebook in an NR system according to an embodiment of the disclosure.

Based on a PDSCH-to-HARQ_feedback timing value for PUCCH transmission including HARQ-ACK information of slot n, and based on K0 which is transmission slot position information of a PDSCH scheduled in DCI format 1_0 or 1_1, the UE transmits the HARQ-ACK information with respect to PDSCH reception or SPS PDSCH release in that slot n. Specifically, for the above-described HARQ-ACK information transmission, the UE determines the HARQ-ACK codebook of the PUCCH to be transmitted in the slot determined by the PDSCH-to-HARQ_feedback timing and K0, based on a downlink assignment indicator (DAI) included in the DCI indicating the PDSCH reception or SPS PDSCH release.

The DAI consists of a counter DAI and a total DAI. The counter DAI is information indicating, in the HARQ-ACK codebook, the location of HARQ-ACK information corresponding to the PDSCH scheduled in DCI format 1_0 or DCI format 1_1. Specifically, the counter DAI value in DCI format 1_0 or 1_1 informs the cumulative value of PDSCH reception or SPS PDSCH release scheduled by DCI format 1_0 or DCI format 1_1 in a specific cell c. This cumulative value is configured based on a PDCCH monitoring occasion and a serving cell in which the scheduled DCI exists.

The total DAI is a value indicating the size of the HARQ-ACK codebook. Specifically, the value of total DAI refers to the total number of PDSCH receptions or SPS PDSCH releases previously scheduled including a time point at which DCI is scheduled. In addition, the total DAI may be used when the HARQ-ACK information in the serving cell c also includes HARQ-ACK information for the PDSCH scheduled in another cell including the serving cell c in a carrier aggregation (CA) situation. In other words, the total DAI parameter may not be required in a system operating with one cell.

An operation example for the DAI is shown in FIG. 4. FIG. 4 is a diagram illustrating, when the UE transmits the HARQ-ACK codebook selected based on the DAI via a PUCCH 420 in slot n of carrier 0 (402) in a situation where two carriers are configured, variations in the values of counter DAI (C-DAI) and total DAI (T-DAI) indicated by DCI searched for according to each PDCCH monitoring occasion configured for each carrier.

First, the DCI searched for at m=0 (406) indicates the value 412 of 1 for each of C-DAI and T-DAI. The DCI found at m=1 (408) indicates the value 414 of 2 for each of C-DAI and T-DAI. The DCI found in carrier 0 (c=0, 402) of m=2 (410) indicates the value 416 of 3 for C-DAI. The DCI found in carrier 1 (c=1, 404) of m=2 (410) indicates the value 418 of 4 for C-DAI. At this time, when carriers 0 and 1 are scheduled on the same monitoring occasion, T-DAI is all indicated as 4.

HARQ-ACK codebook determination disclosed in FIGS. 3 and 4 represents an operation assuming a situation where only one PUCCH containing HARQ-ACK information is transmitted within one slot. This is called mode 1. As an example of a method that one PUCCH transmission resource is determined within one slot, when PDSCHs scheduled via different DCIs are multiplexed into one HARQ-ACK codebook in the same slot and transmitted, a PUCCH resource selected for HARQ-ACK transmission may be determined as a PUCCH resource indicated by a PUCCH resource field in DCI that last scheduled the PDSCH. That is, a PUCCH resource indicated by the PUCCH resource field in DCI received before the DCI that last scheduled the PDSCH may be ignored.

The following description defines a method and apparatus for determining a HARQ-ACK codebook in a situation where two or more PUCCHs containing HARQ-ACK information can be transmitted in one slot. This is called mode 2. The UE may be capable of operating in only mode 1 (transmitting only one HARQ-ACK PUCCH in one slot) or in only mode 2 (transmitting one or more HARQ-ACK PUCCHs in one slot). Alternatively, the UE supporting both mode 1 and mode 2 may be configured with higher signaling by the base station to operate in only one mode, or mode 1 and mode 2 may be implicitly determined by DCI format, RNTI, DCI specific field value, scrambling, or the like. For example, a PDSCH scheduled in DCI format A and associated HARQ-ACK information may operate based on mode 1, and a PDSCH scheduled in DCI format B and associated HARQ-ACK information may operate based on mode 2.

Figure 5:
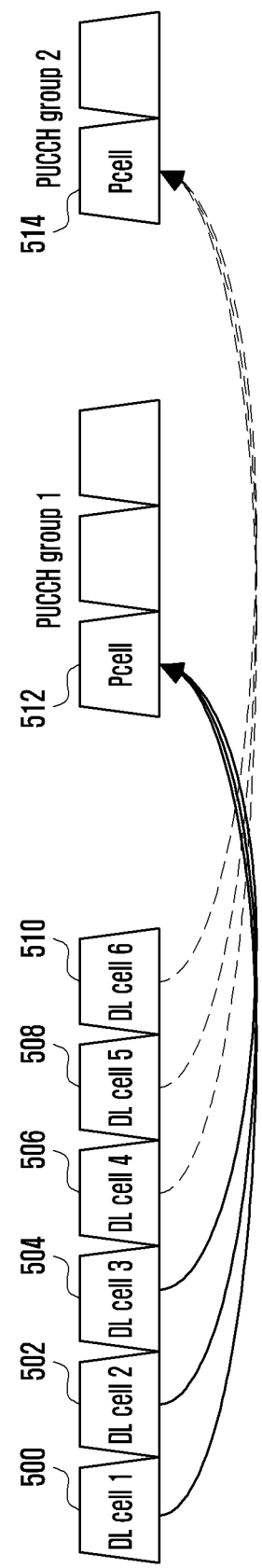
FIG. 5 is a diagram illustrating the concept of a PUCCH cell associated with a downlink cell in a carrier aggregation situation according to an embodiment of the disclosure.

FIG. 5 is a diagram illustrating the concept of a PUCCH cell associated with a downlink cell in a carrier aggregation situation according to an embodiment of the disclosure.

HARQ-ACK information is basically used by the UE to notify the demodulation/decoding result for a scheduled PDSCH to the base station. In the NR, all feedbacks (i.e., uplink control information, UCI) including the HARQ-ACK information are transmitted via a primary cell. This situation is determined in consideration of the fact that the number of downlink cells and the number of uplink cells may not be always equal to each other as described above. Accordingly, the HARQ-ACK information with respect to a large number of downlink component carriers may be transmitted/received through one uplink carrier. In case that the number of downlink component carriers increases, the number of UCI bits for HARQ-ACK or other UCI information may increase, which may be a burden to transmit only on a single uplink carrier. In order to compensate for this problem, in the NR, two PUCCH groups are configured such that the first group transmits PUCCH including UCI information through Pcell and the second group transmits PUCCH including UCI information through PScell. FIG. 5 shows a related example. In FIG. 5, Pcell denoted by 512 is a cell in which PUCCH transmission/reception for downlink cells 500, 502, and 504 corresponding to PUCCH group 1 is performed. Also, in FIG. 5, PScell denoted by 514 is a cell in which PUCCH transmission/reception for downlink cells 506, 508, and 510 corresponding to PUCCH group 2 is performed. For a detailed PUCCH group creation method, refer to section 6.3.2 of 3GPP standard TS38.331, and for a PUCCH information transmission/reception operation method according to the PUCCH group, refer to section 9 of 3GPP standard TS38.213.

Embodiments described below solve problems that may occur between carriers existing in one PUCCH group or in the same PUCCH group. As described above, URLLC is a service that requires high reliability and low latency, and it is an important factor to minimize unnecessary latency time between the base station and the UE. If TDD configuration information of carrier-aggregated cells is different, the base station allocates resources for transmitting PUCCHs for downlink component carriers associated with the same PUCCH group in consideration of configuration information of a slot format indicator (SFI) of the Pcell. That is, the PUCCH cannot be transmitted for symbols indicated as downlink by a higher signal or L1 signal in the Pcell. Accordingly, there is a possibility that a transmission latency time of the PUCCH is increased. In the following embodiments, methods for minimizing such a latency time will be discussed.

Figure 6:
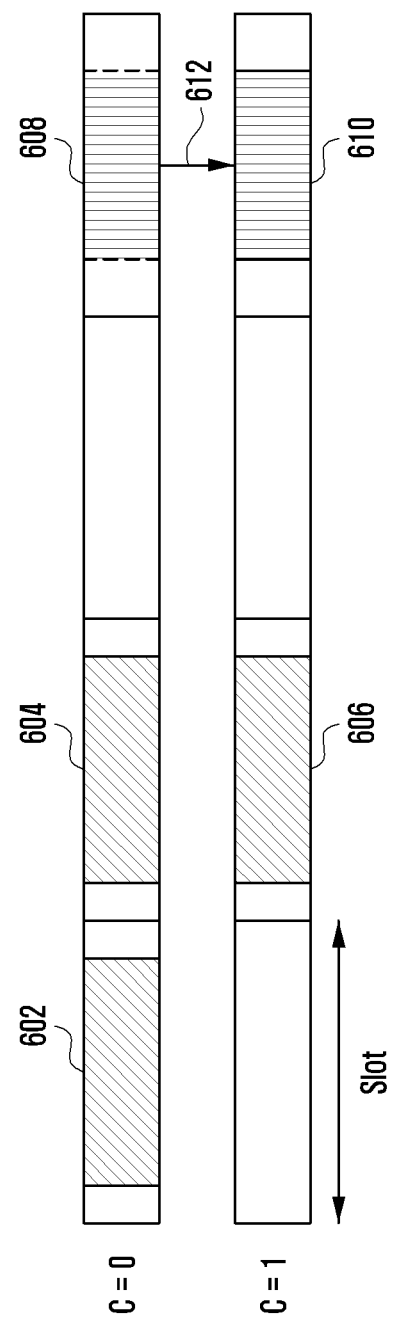
FIG. 6 is a diagram illustrating a method for transmitting HARQ-ACK information in a situation where aggregated carriers have different TDD structures according to an embodiment of the disclosure.

FIG. 6 is a diagram illustrating a method for transmitting HARQ-ACK information in a situation where aggregated carriers have different TDD structures according to an embodiment of the disclosure.

FIG. 6 shows a situation in which two carriers are aggregated with each other. A cell having a cell index of 0 (c=0) is Pcell is, and a cell having a cell index of 1 (c=1) is a secondary cell (Scell). Because both carriers are TDD, the number of uplink cells and the number of downlink cells are equal to each other as 2. Although a downlink cell index and an uplink cell index are regarded as being equal in this example, they may have different values. For example, the downlink cell index 3 may be associated with an uplink primary cell. In addition, it may be possible to configure TDD configuration information for the cell of c=0 and the cell of c=1 to have different directions by SFI. In FIG. 6, the base station may schedule two PDSCHs 602 and 604 via DCI in the cell of c=0. A resource for transmitting a PUCCH 608 including HARQ-ACK information for the corresponding PDSCH may be determined by a PUCCH resource indicator field and PDSCH-to-HARQ-ACK timing information in DCI. Also, a PUCCH including HARQ-ACK information for a PDSCH 606 scheduled at c=1 is transmitted at 608. Therefore, HARQ-ACK information included in the PUCCH 608 includes demodulation/decoding results for the PDSCHs 602 and 604 of c=0 and the PDSCH 606 of c=1, and the PUCCH including the HARQ-ACK information is transmitted from the UE to the base station through the PUCCH 608 of the primary cell (c=0). However, in case that a part of the resources of the PUCCH 608 is indicated as a downlink symbol by a higher signal or L1 signal, the UE cannot transmit the PUCCH 608 and may perform an arbitrary operation by considering it as an error case. Therefore, in order to prevent this situation from occurring, the base station must ensure that all symbols through which the PUCCH 608 is transmitted become uplink symbols. In the TDD structure, because there is usually a lot of downlink traffic, the ratio of downlink symbols is higher than that of uplink symbols. Therefore, the UE described in section 5.3 of TS 38.214 of the 3GPP standard will transmit the PUCCH 608 in the first existing uplink symbol as long as it satisfies the minimum processing time required for transmitting HARQ-ACK information for the PDSCH. If some of the resources of the PUCCH 608 are indicated as downlink symbols as in FIG. 6, the corresponding PUCCH may be scheduled with a delay in a slot where a subsequent uplink symbol exists. However, as described above, the HARQ-ACK transmission delay in URLLC causes a delay in the retransmission of the PDSCH and thus causes a problem of increasing the latency time for the overall data transmission/ reception. Therefore, if the PUCCH 608 resource can be transmitted in the same slot of the secondary cell other than the primary cell, it may be reasonable in terms of reducing the latency time to transmit the PUCCH to the secondary cell other than the primary cell. For example, by considering the PUCCH 608 of c=0 as the PUCCH 610 of c=1 through an explicit or implicit change scheme 612, the UE may transmit the corresponding PUCCH 610 in c=1. At this time, the PUCCH 608 and the PUCCH 610 include the same UCI information, and the PUCCH resource information may be unchanged regardless of the cell index or changed explicitly or implicitly for a changed cell. For example, in case that the PUCCH resource information is unchanged regardless of the cell index, the UE may assume that the same PUCCH transmission is performed based on the lowest RB index based on the activated BWP regardless of the frequency bandwidth size in both c=0 and c=1. In the other case, for example, if the frequency band of c=0 is 100 MHz and the frequency band of c=1 is 10 MHz, frequency resource allocation information, frequency hopping information, PUCCH power allocation information, etc. may be changed. Before the changed information is supported, the base station may provide PUCCH-related configuration information described in section 6.3.2 of 3GPP standard TS 38.331 to the UE in advance for each cell, and the UE may consider and apply the higher level information for the changed cells. In this case, a separate additional DCI field or L1 signal may not be required. Also, a combination of the two schemes may be applied. For example, if different PUCCH configuration information for each cell cannot be configured via a higher signal, the UE may regard the PUCCH configuration information for each cell as the same and follow the above-described method. On the other hand, if different PUCCH configuration information for each cell is configured via a higher signal, the UE may perform PUCCH transmission in consideration of PUCCH higher signal configuration information related to the cell according to the changed cell index.

Therefore, in the existing Rel-15 NR, indicating a PUCCH resource by another DCI in a resource indicated as a downlink symbol was regarded as an error case, but in case that respective carriers have different TDD configuration information in the carrier aggregation described above in FIG. 6, the error case may no longer be an error case. There are two methods for supporting the change scheme 612 for changing the PUCCH 608 to the PUCCH 610 in FIG. 6, as follows.

Method 6-1: Implicit method (Change a cell index to transmit PUCCH by a specific scheme)

This method is transmitting PUCCH information for valid uplink symbols based on slot format information previously configured for each cell without a separate L1 signaling indication. Basically, when a PUCCH resource finally indicated by DCI is valid in the primary cell, the UE transmits the PUCCH resource in the primary cell. On the other hand, if a PUCCH resource finally indicated by DCI is not valid in the primary cell, the UE transmits the PUCCH resource in a secondary cell having the earliest order among orders determined by at least one of the following detailed methods among secondary cells in which PUCCH resource transmission is valid. The meaning of being valid above is that at least a part of the symbols of the indicated PUCCH resource is not configured/indicated as a downlink symbol. The meaning of being not valid is that at least a part of the symbols of the indicated PUCCH resource is configured/ indicated as a downlink symbol. Here, the cell index may be a cell index in view of a logical channel or a cell index in view of a physical channel.

Detailed Method 6-1-1: When the primary cell index is c=i, a cell to transmit the PUCCH is determined in ascending order (c=0→1→2→ . . . ) or in descending order (c=k→k−1→k−2→ . . . ) of the remaining cell indices except for c=i among the secondary cells. Here, k denotes the total number of cells in which the PUCCH can be transmitted in a carrier aggregation situation, the total number of uplink transmission cells, or a value configure by the base station. According to this detailed method, if 0, 5, and 6 among secondary cells are valid for PUCCH resource transmission, the PUCCH is transmitted and received in the secondary cell corresponding to c=0 in case of ascending order or in the secondary cell corresponding to c=6 in case of descending order.

Detailed Method 6-1-2: When the primary cell index is c=i, a cell to transmit the PUCCH is determined in ascending order or in descending order of the remaining cell indices except for c=i among the secondary cells. A difference from the detailed method 6-1-1 is that the ascending or descending order is determined based on the primary cell index. For example, in case of ascending order, determination is made in the order of primary cell (c=i)→c=mod(i+1, k)→c=mod(i+2, k)→c=mod(i+3, k)→. . . , and in case of descending order, determination is made in the order of primary cell (c=i)→c=mod(i−1, k)→c=mod(i−2, k)→c=mod(i−3, k)→. . . . According to this detailed method, if 0, 5, and 6 among secondary cells are valid for PUCCH resource transmission and i=4, the PUCCH is transmitted and received in the secondary cell corresponding to c=5 in case of ascending order or c=0 in case of descending order.

According to method 6-1, the UE may implicitly select a cell to transmit the PUCCH. If both the primary cell and the secondary cell in one PUCCH group are not valid cells capable of transmitting the PUCCH resource, the UE may regard it as an error case and perform an arbitrary operation.

Method 6-2: Explicit method (Select a PUCCH transmission cell index)

This method is explicitly indicating, via a DCI field or L1 signaling, a cell index for transmission of PUCCH including UCI information, similar to cross-carrier scheduling in which a cell for PDCCH transmission/reception and a cell for PDSCH/PUSCH transmission/reception are different. The following detailed methods may be considered, and at least one of them may be used.

Detailed Method 6-2-1: An additional DCI field may be used like a carrier indication field (CIF). In case that a bit field is n bits, the UE may indicate a total of 2n cell indexes. The base station may inform in advance which uplink cell index is associated with each corresponding value via a higher signal. In this case, the first value may correspond to the primary cell.

Detailed Method 6-2-2: In information indicated through a PUCCH resource indicator which is a field of DCI indicating PUCCH resources, information associated with a specific cell index via a higher signal may be further included. If there is no corresponding higher signal configuration, the UE may determine PUCCH resource information as being associated with the primary cell. Specifically, the PUCCH resource indicator includes PUCCH format, time/frequency resource information, hopping information, etc. as higher signal configuration information (refer to section 6.3.2 of 3GPP standard TS 38.331), and cell index information for PUCCH transmission is also included in the higher signal configuration information.

Detailed Method 6-2-3: A cell index for PUCCH transmission may be associated with a CORESET or search space index. Specifically, in higher signal configuration information related to CORESET or search space, a cell index for transmission of PUCCH information about DCI detected according to the higher signal configuration information related to CORESET or search space may be configured in advance. If the higher signal configuration information is not included in a higher signal related to CORESET or search space in advance, the UE may determine that PUCCH information is transmitted in the primary cell.

Detailed Method 6-2-4: The cell index for PUCCH transmission may be determined based on RNTI or any other RRC configuration information (sub-slot configuration, HARQ-ACK codebook index, processing time). For example, the UE may interpret that PUCCH information is transmitted in the primary cell in case of RNTI A and in one of the secondary cells previously configured via a higher signal in case of RNTI B. In addition, the cell index for PUCCH transmission may be determined based on sub-slot configuration that is an RRC parameter indicating the PDSCH-to-HARQ-ACK feedback timing in a sub-slot unit smaller than 14 symbols rather than in a slot unit. Similarly, the cell index for PUCCH transmission may be determined based on the HARQ-ACK codebook index value or processing time capability determined in a higher signal or L1 signal.

Figure 7:
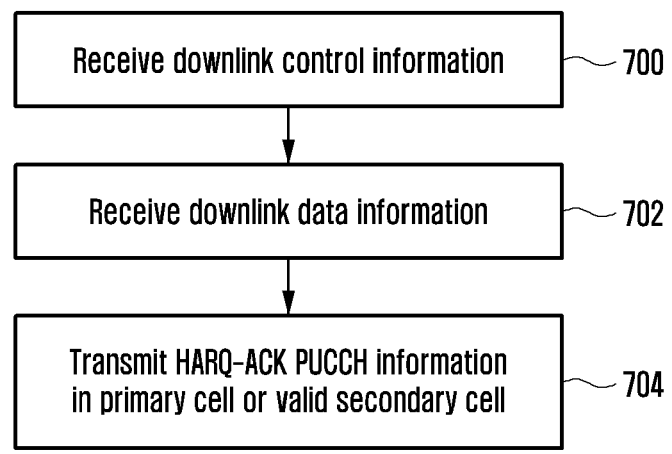
FIG. 7 is a flow diagram illustrating an operation of a UE for transmitting HARQ-ACK information in a situation where aggregated carriers have different TDD structures according to an embodiment of the disclosure.

FIG. 7 is a flow diagram illustrating an operation of a UE for transmitting HARQ-ACK information in a situation where aggregated carriers have different TDD structures according to an embodiment of the disclosure.

As described above in FIG. 6, in a situation where carrier aggregation is supported and configured, at operation 700 the UE may receive downlink control information from the base station in a downlink control channel configured from one cell or several cells. At operation 702, depending on information indicated by the downlink control information, the UE may receive downlink data information in a self-carrier scheduling scheme or a cross-carrier scheduling scheme. The self-carrier scheduling is a scheduling scheme in which downlink control information and data information are transmitted/received in the same cell, and the cross-carrier scheduling is a scheduling scheme in which downlink control information and data information are transmitted/received in different cells. In response to receiving the downlink data information, the UE transmits a PUCCH including HARQ-ACK information to the base station in a specific cell. Using at least one of the methods described above in FIG. 6, at operation 704 the UE may transmit the PUCCH including the HARQ-ACK information to the base station in a primary cell or a valid secondary cell.

Figure 8:
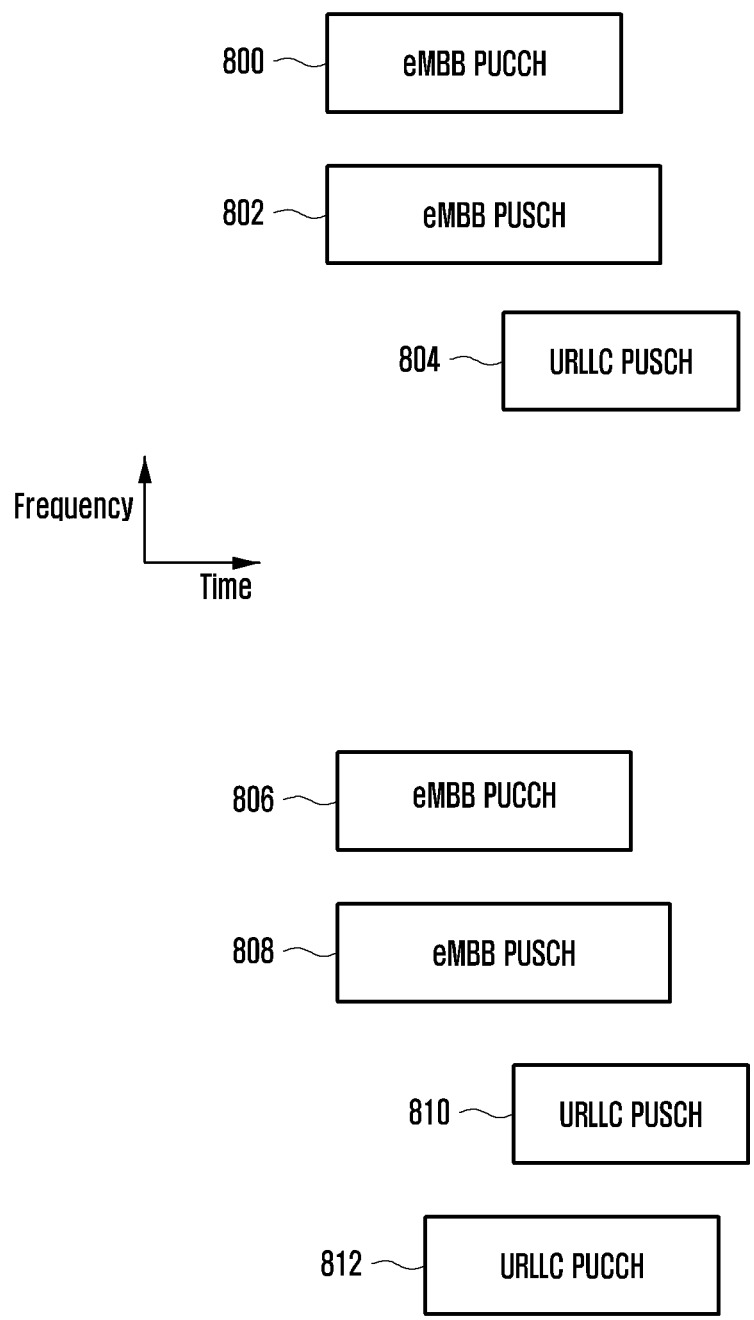
FIG. 8 illustrates a situation where an uplink control channel and data channel having different priorities overlap with each other in view of time resources in one cell according to an embodiment of the disclosure.

FIG. 8 illustrates a situation where an uplink control channel and data channel having different priorities overlap with each other in view of time resources in one cell according to an embodiment of the disclosure.

In FIG. 8, when the UE reports the UE capability for simultaneous PUCCH and PUSCH transmission in one cell, and when the base station configures it to the UE, the UE may simultaneously transmit a PUCCH and a PUSCH. In addition, the priority of the PUCCH and the PUSCH may be determined via a higher level signal or an L1 signal. For example, in the L1 signal, based on DCI field information, RNTI, DCI format information, and DCI-detected CORE- SET/search space, it may be determined whether the PUCCH is a PUCCH having a high priority (e.g., URLLC PUCCH) or a PUCCH having a low priority (e.g., eMBB PUCCH), and whether the PUSCH is a PUSCH having a high priority (e.g., URLLC PUSCH) or a PUSCH having a low priority (e.g., eMBB PUSCH). Although in FIG. 8 two steps of priority are expressed, it can be sufficiently applied to a case having more step values. As shown in FIG. 8, a case where eMBB PUCCH 800, eMBB PUSCH 802, and URLLC PUSCH 804 are scheduled via base station scheduling may be possible. Basically, when multiplexing is possible only for PUCCH and PUSCH having the same priority, the UE will transmit UCI information contained in the eMBB PUCCH by including it in the eMBB PUSCH 802. However, because the UE does not support simultaneous transmission of the eMBB PUSCH and the URLLC PUSCH, the UE should not include the UCI information contained in the eMBB PUCCH in the eMBB PUSCH. Therefore, the UE drops the eMBB PUSCH 802 and performs simultaneous transmission of the eMBB PUCCH 800 and the URLLC PUSCH 804.

Alternatively, when the UE is capable of simultaneous PUSCH and PUCCH transmission in one cell, the UE may determine whether PUSCHs overlap with each other and PUCCHs overlap with each other in view of time resources among all PUSCHs and PUCCHs received from the base station. For example, FIG. 8 shows a situation in which eMBB PUCCH 806, eMBB PUSCH 808, URLLC PUSCH 810, and URLLC PUCCH 812 overlap within at least one symbol in view of time resources. In such a situation, the UE may be capable of supporting at least one of the following two methods.

Method 8-1: This is a method of performing a drop operation according to priority for each PUSCH/PUCCH and then finally transmitting only one PUSCH and one PUCCH. When the overlapping situation as shown in FIG. 8 occurs, the UE may transmit the URLLC PUCCH 812 while dropping the eMBB PUCCH 806 in view of PUCCH, and transmit the URLLC PUSCH 810 while dropping the eMBB PUSCH 808 in view of PUSCH. The advantage of this method is that the UE does not need to additionally consider whether PUSCH and PUCCH are multiplexed.

Method 8-2: In the method 1, eMBB PUCCH is dropped. If HARQ-ACK feedback information is included in eMBB PUCCH information, the base station has no choice but to perform retransmission of all PDSCHs related to HARQ-ACK information. In order to solve this problem, a method of supporting multiplexing for PUCCH/PUSCH with a higher priority and transmitting PUCCH with a lower priority may be considered. In FIG. 8, UCI information included in the URLLC PUCCH is included in the URLLC PUSCH and transmitted, and the eMBB PUCCH is transmitted. Also, the eMBB PUSCH having a lower priority than that of the URLLC PUSCH is dropped. Therefore, the method 2 has an advantage in that the number of dropped channels is reduced compared to the method 1.

Method 8-3: This method is similar to the method 1, but the eMBB PUCCH may be transmitted via another cell. If the eMBB PUCCH cannot be transmitted in the situation of FIG. 8, and if the UE supports carrier aggregation, the UE transmits the eMBB PUCCH in the secondary cell other than the primary cell similarly to the method described in FIG. 6.

The PUCCH/PUSCH described in FIG. 8 may be a resource scheduled by DCI or resources configured via a higher signal in advance.

Figure 9:
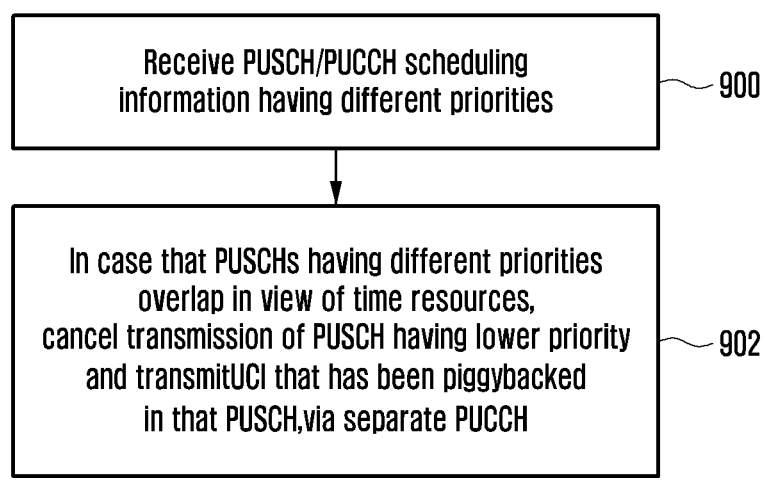
FIG. 9 is a flow diagram illustrating an operation of a UE when an uplink control channel and data channel having different priorities overlap with each other in view of time resources in one cell according to an embodiment of the disclosure.

FIG. 9 is a flow diagram illustrating an operation of a UE when an uplink control channel and data channel having different priorities overlap with each other in view of time resources in one cell according to an embodiment of the disclosure.

At operation 900, the UE may receive PUSCH/PUCCH scheduling information having different priorities. In addition, when PUSCHs having different priorities overlap in view of time resources, at operation 902 the UE may cancel transmission of a PUSCH having a lower priority and transmit UCI that has been piggybacked in that PUSCH, via a separate PUCCH. Alternatively, based on the methods described above in FIG. 8, for PUCCHs or PUSCHs having different priorities, the UE may drop some PUCCHs or PUSCHs through a drop or multiplexing scheme and transmit the other PUCCHs or PUSCHs that are not dropped to the base station.

Figure 10:
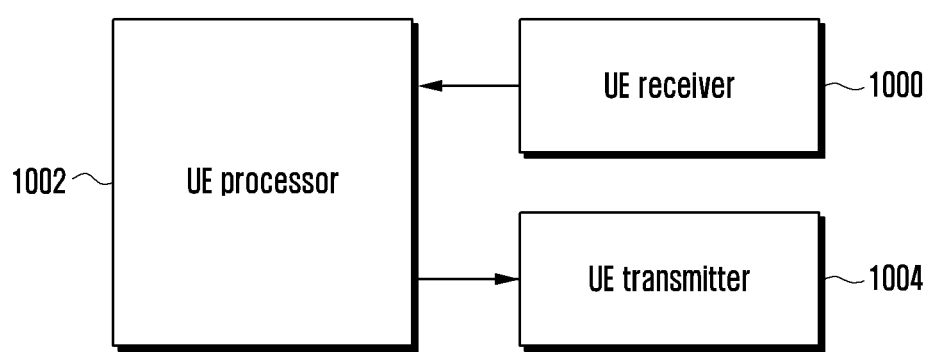
FIG. 10 is a diagram schematically illustrating a structure of a UE according to an embodiment of the disclosure.

FIG. 10 is a diagram schematically illustrating a structure of a UE according to an embodiment of the disclosure.

With reference to FIG. 10, the UE may include a processor 1001, a transceiver 1002, and a memory 1003. In the disclosure, the processor may be defined as a circuit, an application-specific integrated circuit, or at least one processor.

The processor 1001 according to an embodiment of the disclosure may control the overall operation of the UE. For example, the processor 1001 may control a signal flow between blocks to perform the operations described above in the flowchart. Also, the processor 1001 may write data to and read data from the memory 1003. In addition, the processor 1001 may perform functions of a protocol stack required by a communication standard. To this end, the processor 1001 may include at least one processor or microprocessor, or the processor 1001 may be a part of the processor. Also, a part of the transceiver 1002 and the processor 1001 may be referred to as a communication processor (CP).

According to an embodiment of the disclosure, the processor 1001 may control the operations of the UE described above with reference to FIGS. 1 to 9.

By executing a program stored in the memory 1003, the processor 1001 according to an embodiment of the disclosure may receive a plurality of PDSCHs from the base station, determine HARQ-ACK codebook information for the plurality of PDSCHs based on HARQ-ACK timing information, and transmit a plurality of HARQ-ACKs for the plurality of PDSCHs to the base station through one slot based on the determined HARQ-ACK codebook information.

The transceiver 1002 according to an embodiment of the disclosure may perform functions for transmitting and receiving signals through a wireless channel. For example, the transceiver 1002 may perform a conversion function between a baseband signal and a bit stream in accordance with a physical layer standard of a system. For example, upon data transmission, the transceiver 1002 may generate complex symbols by encoding and modulating a bit stream to be transmitted. Also, upon data reception, the transceiver 1002 may restore a received bit stream by demodulating and decoding a baseband signal. In addition, the transceiver 1002 may up-convert a baseband signal into an RF band signal and then transmit it through an antenna, and down-convert an RF band signal received through an antenna into a baseband signal. For example, the transceiver 1002 may include a transmit filter, a receive filter, an amplifier, a mixer, an oscillator, a DAC, an ADC, and the like. Also, the transceiver 1002 may include a plurality of transmission/reception paths. Furthermore, the transceiver 1002 may include at least one antenna array composed of a plurality of antenna elements. In terms of hardware, the transceiver 1002 may be composed of a digital circuit and an analog circuit (e.g., a radio frequency integrated circuit (RFIC)). Here, the digital circuit and the analog circuit may be implemented as one package. In addition, the transceiver 1002 may include a plurality of RF chains.

The memory 1003 according to an embodiment of the disclosure may store data such as a default program, an application program, and configuration information for the operation of the UE. The memory 1003 may be composed of a volatile memory, a non-volatile memory, or a combination thereof. In addition, the memory 1003 may provide stored data at the request of the processor 1001. The memory 1003 may store at least one of information transmitted/received through the transceiver 1002 and information generated through the processor 1001.

Figure 11:
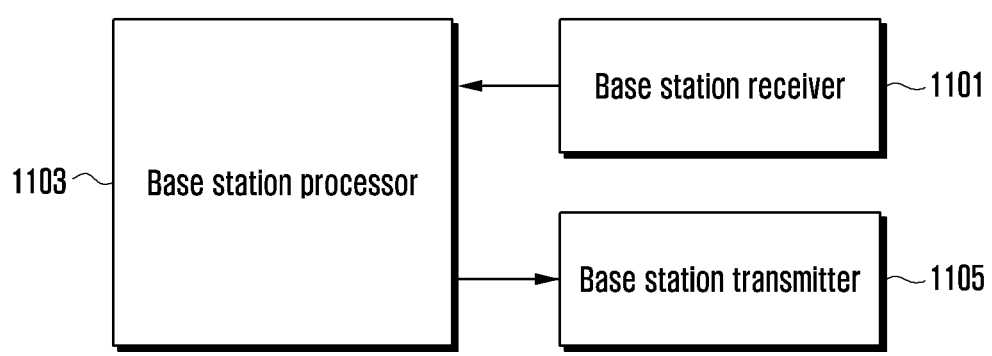
FIG. 11 is a diagram schematically illustrating a structure of a base station according to an embodiment of the disclosure.

FIG. 11 is a diagram schematically illustrating a structure of a base station according to an embodiment of the disclosure.

With reference to FIG. 11, the base station may include a processor 1101, a transceiver 1102, and a memory 1103. In the disclosure, the processor may be defined as a circuit, an application-specific integrated circuit, or at least one processor.

The processor 1101 according to an embodiment of the disclosure may control the overall operation of the base station. For example, the processor 1101 may control a signal flow between blocks to perform the operations described above in the flowchart. Also, the processor 1101 may write data to and read data from the memory 1103. In addition, the processor 1101 may perform functions of a protocol stack required by a communication standard. To this end, the processor 1101 may include at least one processor or microprocessor, or the processor 1101 may be a part of the processor. Also, a part of the transceiver 1102 and the processor 1001 may be referred to as a communication processor (CP).

According to an embodiment of the disclosure, the processor 1101 may control the operations of the base station described above with reference to FIGS. 1 to 9.

By executing a program stored in the memory 1103, the processor 1101 according to an embodiment of the disclosure may transmit a plurality of PDSCHs to the UE, and receive a plurality of HARQ-ACKs for the plurality of PDSCHs from the UE through one slot based on HARQ-ACK codebook information determined by the UE.

The transceiver 1102 according to an embodiment of the disclosure may perform functions for transmitting and receiving signals through a wireless channel. For example, the transceiver 1102 may perform a conversion function between a baseband signal and a bit stream in accordance with a physical layer standard of a system. For example, upon data transmission, the transceiver 1102 may generate complex symbols by encoding and modulating a bit stream to be transmitted. Also, upon data reception, the transceiver 1102 may restore a received bit stream by demodulating and decoding a baseband signal. In addition, the transceiver 1102 may up-convert a baseband signal into an RF band signal and then transmit it through an antenna, and down-convert an RF band signal received through an antenna into a baseband signal. For example, the transceiver 1102 may include a transmit filter, a receive filter, an amplifier, a mixer, an oscillator, a DAC, an ADC, and the like. Also, the transceiver 1102 may include a plurality of transmission/reception paths. Furthermore, the transceiver 1102 may include at least one antenna array composed of a plurality of antenna elements. In terms of hardware, the transceiver 1102 may be composed of a digital circuit and an analog circuit (e.g., a radio frequency integrated circuit (RFIC)). Here, the digital circuit and the analog circuit may be implemented as one package. In addition, the transceiver 1102 may include a plurality of RF chains.

The memory 1103 according to an embodiment of the disclosure may store data such as a default program, an application program, and configuration information for the operation of the base station. The memory 1103 may be composed of a volatile memory, a non-volatile memory, or a combination thereof. In addition, the memory 1103 may provide stored data at the request of the processor 1101. The memory 1103 may store at least one of information transmitted/received through the transceiver 1102 and information generated through the processor 1101.

Figure 12:
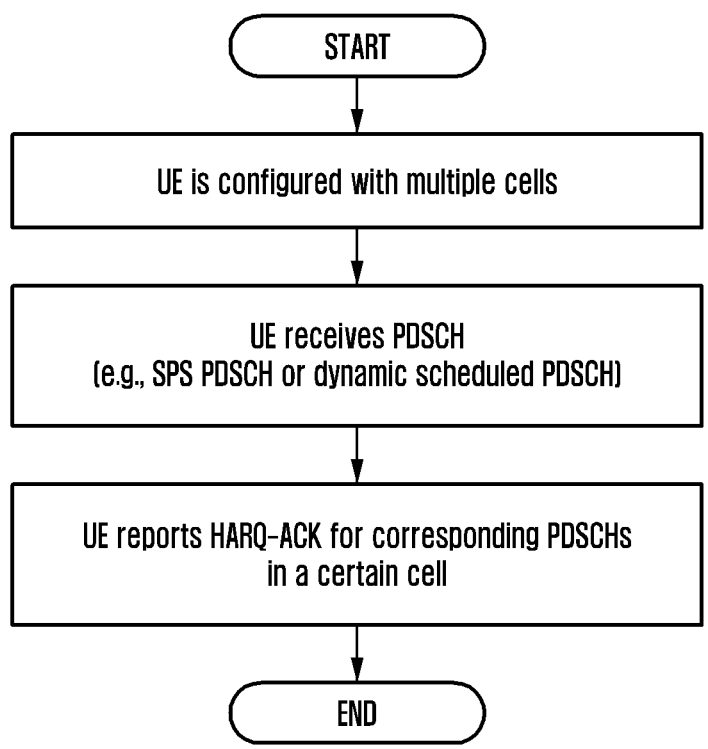
FIG. 12 is a flow diagram summarizing an HARQ-ACK report operation of a UE in response to downlink data reception according to an embodiment.

FIG. 12 is a flow diagram summarizing an HARQ-ACK report operation of a UE in response to downlink data reception according to an embodiment.

The UE may be configured with one or more carriers through a higher signal, and the following Table 4 shows an example of the higher signal.

TABLE 4

PDSCH-ServingCellConfig ::= SEQUENCE codeBlockGroupTransmission
SetupRelease
{PDSCH-CodeBlockGroupTransmission} OPTIONAL, -- Need M:
Configuration information indicating whether retransmission of code block units
is supported
xOverhead ENUMERATED {xOh6, xOh12, xOh18} OPTIONAL, -- Need S:
Xoverhead configuration information for TBS calculation
nrofHARQ-ProcessForPDSCH ENUMERATED {n2, n4, n6, n10, n12, n16}
OPTIONAL, -- Need S: Configuration information for total number of HARQ-
ACK processes
pucch-Cell ServCellIndex
OPTIONAL, -- Cond SCellAddOnly: Applied only to a secondary cell, designate
a cell index in which PUCCH including HARQ-ACK information for PDSCH is
transmitted
Dynamic-carrier-selection-for-PUCCH ENUMERATED {enable, disable
OPTIONAL : A higher signal that determines whether or not to dynamically select
a cell that transmits HARQ-ACK PUCCH
...,
[[
maxMIMO-Layers INTEGER (1..8)

TABLE 4-continued

OPTIONAL, -- Need M: Configuration information for maximum number of MIMO layers
processingType2Enabled BOOLEAN
OPTIONAL, -- Need M: Configuration information for processing capability 2
]],
}

Table 4 shows information elements included in a higher signal that can be configured for each UE. In case the UE is configured to receive the PDSCH in a scell other than the primary cell (pcell), the ServCellIndex for transmitting the PUCCH including HARQ-ACK information for the PDSCH may be configured as shown in Table 4 above. One Serv-CellIndex may be configured for each PUCCH group cell, and the configured ServCellIndex value may be the primary cell or any other cell index value. This may be determined by the UE capability. For example, in case that the UE can transmit PUCCHs or PUSCHs simultaneously through a plurality of cells, the ServCellIndex in Table 4 above may be configured as a cell index value other than the primary cell. For example, the UE may be able to transmit the PUCCH through cells corresponding to different cell index values for two PDSCH receiving cells, respectively. In another example, in case that the UE is configured with a plurality of cells, but can transmit PUCCH or PUSCH through one cell, the ServCellIndex in Table 4 may be configured as the primary cell or the same cell index value. For example, the UE may be able to transmit the PUCCH through a cell corresponding to the same cell index value for two PDSCH receiving cells. In still another example, although the UE cannot transmit PUCCH or PUSCH simultaneously through a plurality of cells, it may be possible to receive a plurality of cell indexes for a pucch-Cell for one PDSCH cell in Table 4. As described above in FIGS. 6 and 7, it may be possible to select a cell (pucch-Cell) for transmitting the PUCCH including HARQ-ACK information for the scheduled PDSCH as one value of a plurality of cell indexes configured in advance via a higher signal through the L1 signal. In yet another example, higher signal information other than the higher signal described above in Table 4 may be added to inform whether the pucch-Cell information can configure one or a plurality of cell indexes. In yet another example, there may be a higher signal parameter indicating whether a carrier for transmitting HARQ-ACK PUCCH can be dynamically selected, such as dynamic-carrier-selection-for-PUCCH in Table 4. When this parameter is disabled, a cell for the UE to transmit the HARQ-ACK PUCCH may be fixed to one common cell, and a cell index for the pucch-Cell may be fixed to one value. When this parameter is enabled, the UE may receive the pucch-cell or other serving cell information for transmitting a plurality of HARQ-ACK PUCCHs, and a cell index dynamically transmitting the HARQ-ACK PUCCH according to the method described with reference to FIGS. 6 and 7 may be indicated.

After receiving the higher signal, the UE determines a cell index through which the PUCCH including the HARQ-ACK information for the received PDSCH is transmitted/received. The PDSCH may be a PDSCH scheduled with DCI or may correspond to at least one of a PDSCH (e.g., SPS PDSCH) scheduled without DCI, a PDSCH (e.g., URLLC PDSCH) having a high priority by priority information, or a PDSCH (e.g., eMBB PDSCH or MTC PDSCH) having a low priority by priority information. The cell index through which the PUCCH including the HARQ-ACK information is transmitted and received may be fixed to one cell index or have a plurality of cell indexes. The UE may transmit the PUCCH including HARQ-ACK information by explicitly or implicitly selecting a specific cell as described above in FIGS. 6 and 7 or with one cell index always configured by the higher signal regardless of the index selection. The UE may apply at least one of these methods, and which method to apply may be notified to the UE by a higher signal or an L1 signal.

In the disclosure, the higher signal may be at least one of RRC, MAC CE, system access information, or information exchanged at an application level.

In the disclosure, the L1 signal may be at least one of the followings, which may be commonly applied to the L1 signal described above in the disclosure.

Specific bit field value in DCI: It is a bit field constituting DCI and may correspond to the existing DCI field (HARQ process number, MCS information, Carrier indicator, BWP indicator, RV indicator, NDI information, time allocation information, frequency allocation information, PUCCH resource information, power allocation information, etc.) or a new DCI field (e.g., PUCCH carrier index information for HARQ-ACK information transmission).

DCI format information: There may be one or a plurality of DCI formats monitored by the UE. PUCCH carrier index information for transmitting HARQ-ACK information associated with each DCI format may be configured in advance. For example, DCI format a may be cell index 1, DCI format b may be cell index 2, and the like.

RNTI value scrambled to CRC of DCI: The scrambled RNTI of CRC of DCI is various, and PUCCH carrier index information for transmission of HARQ-ACK information associated with the scrambled RNTI like DCI format may be configured in advance. For example, RNTI A may be cell index 1, RNTI b may be cell index 2, and the like.

PDCCH configuration information (CORESET, search space, etc.) through which DCI is transmitted/received may correspond. The PDCCH transmission resource (CORESET, search space, cell index, BWP, time or frequency resource) through which DCI can be transmitted and received may also vary, and PUCCH carrier index information for transmission of HARQ-ACK information associated with the scrambled RNTI like DCI format may be configured in advance. For example, PDCCH a may be cell index 1, PDCCH b may be cell index 2, and the like.

The methods according to claims or embodiments described in the disclosure may be implemented by hardware, software, or a combination of hardware and software.

In case of implementation using software, a computer-readable storage medium for storing one or more programs (software modules) may be provided as hardware. One or more programs stored in the computer-readable storage medium are configured for execution by one or more processors in an electronic device. The one or more programs include instructions that cause the electronic device to perform the methods according to claims or embodiments described herein.

Such programs (software module, software) may be stored in a random access memory, a non-volatile memory including a flash memory, a read only memory (ROM), an electrically erasable programmable ROM (EEPROM), a magnetic disc storage device, a compact disc ROM, digital versatile discs (DVDs) or other optical storage devices, and a magnetic cassette. Alternatively, the programs may be stored in a memory combining part or all of the above recording media. A plurality of memories may be equipped.

In addition, the programs may be stored in an attachable storage device accessible via a communication network formed of Internet, Intranet, local area network (LAN), wide area network (WAN), or storage area network (SAN) alone or in combination. This storage device may access an apparatus performing embodiments of the disclosure through an external port. In addition, a separate storage device in the communication network may access an apparatus performing embodiments of the disclosure.

In the above-described embodiments, components or elements have been expressed as a singular or plural form. It should be understood, however, that such singular or plural representations are selected appropriately according to situations presented for the convenience of description, and the disclosure is not limited to the singular or plural form. Even expressed in a singular form, a component or element may be construed as a plurality of components or elements, and vice versa.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, one embodiment of the disclosure may be partially combined with another embodiment to operate a base station and a terminal. As an example, embodiments 1, 2 and 3 of the disclosure may be partially combined to operate a base station and a terminal. Further, although the above embodiments have been described by way of the FDD LTE system, other variants based on the technical idea of the embodiments may be implemented in other systems such as TDD LTE and 5G or NR systems.

Although exemplary embodiments of the present invention have been shown and described in this specification and the drawings, they are used in general sense in order to easily explain technical contents of the present invention, and to help comprehension of the present invention, and are not intended to limit the scope of the present invention. It is obvious to those skilled in the art to which the present invention pertains that other modified embodiments on the basis of the spirits of the present invention besides the embodiments disclosed herein can be carried out.

The invention claimed is:

1. A method performed by a terminal in a communication system, the method comprising:
   receiving, from a base station via higher layer signaling, first information indicating an index of a secondary cell for a physical uplink control channel (PUCCH) cell switching in a PUCCH group, and second information indicating whether the PUCCH cell switching based on dynamic indication in downlink control information (DCI) is enabled;
   receiving, from the base station, DCI scheduling a physical downlink shared channel (PDSCH), wherein the DCI includes a bit field indicating a PUCCH cell;
   receiving, from the base station, the PDSCH based on the DCI; and
   transmitting, to the base station, the PUCCH with hybrid automatic repeat request acknowledgement (HARQ-ACK) information on the PUCCH cell in the PUCCH group based on the bit field.

2. The method of claim 1,
   wherein a size of the bit field is 1 bit,
   wherein the bit field with a value '0' indicates a primary cell as the PUCCH cell in the PUCCH group to transmit the PUCCH with HARQ-ACK information, and
   wherein the bit field with a value '1' indicates the secondary cell corresponding to the index as the PUCCH cell in the PUCCH group to transmit the PUCCH with HARQ-ACK information.

3. The method of claim 1, wherein the secondary cell is associated with time domain duplex (TDD).

4. A method performed by a base station in a communication system, the method comprising:
   transmitting, to a terminal via higher layer signaling, first information indicating an index of a secondary cell for a physical uplink control channel (PUCCH) cell switching in a PUCCH group, and second information indicating whether the PUCCH cell switching based on dynamic indication in downlink control information (DCI) is enabled;
   transmitting, to the terminal, DCI scheduling a physical downlink shared channel (PDSCH), wherein the DCI includes a bit field for indicating a PUCCH cell;
   transmitting, to the terminal, the PDSCH according to the DCI; and
   receiving, from the terminal, the PUCCH with hybrid automatic repeat request acknowledgement (HARQ-ACK) information on the PUCCH cell in the PUCCH group based on the bit field.

5. The method of claim 4,
   wherein a size of the bit field is 1 bit,
   wherein the bit field with a value '0' indicates a primary cell as the PUCCH cell in the PUCCH group to transmit the PUCCH with HARQ-ACK information, and
   wherein the bit field with a value '1' indicates the secondary cell corresponding to the index as the PUCCH cell in the PUCCH group to transmit the PUCCH with HARQ-ACK information.

6. The method of claim 4, wherein the p secondary cell is associated with time domain duplex (TDD).

7. A terminal in a communication system, the terminal comprising:
   a transceiver; and
   a controller configured to:
   receive, from a base station via higher layer signaling, first information indicating an index of a secondary cell for a physical uplink control channel (PUCCH) cell switching in a PUCCH group, and second information indicating whether the PUCCH cell switching based on dynamic indication in downlink control information (DCI) is enabled,
   receive, from the base station, DCI scheduling a physical downlink shared channel (PDSCH), wherein the DCI includes a bit field indicating a PUCCH cell, receive, from the base station, the PDSCH based on the DCI, and transmit, to the base station, the PUCCH with hybrid automatic repeat request acknowledgement (HARQ-ACK) information on the PUCCH cell in the PUCCH group based on the bit field.

8. The terminal of claim 7,
wherein a size of the bit field is 1 bit,
wherein the bit field with a value '0' indicates a primary cell as the PUCCH cell in the PUCCH group to transmit the PUCCH with HARQ-ACK information, and
wherein the bit field with a value '1' indicates the secondary cell corresponding to the index as the PUCCH cell in the PUCCH group to transmit the PUCCH with HARQ-ACK information.

9. The terminal of claim 7, wherein the secondary cell is associated with time domain duplex (TDD).

10. A base station in a communication system, the base station comprising:
a transceiver; and
a controller configured to:
   transmitting, to a terminal via higher layer signaling, first information indicating an index of a secondary cell for a physical uplink control channel (PUCCH) cell switching in a PUCCH group, and second information indicating whether the PUCCH cell switching based on dynamic indication in downlink control information (DCI) is enabled,
   transmitting, to the terminal, DCI scheduling a physical downlink shared channel (PDSCH), wherein the DCI includes a bit field indicating a PUCCH cell,
   transmitting, to the terminal, the PDSCH according to the DCI, and
   receiving, from the terminal, the PUCCH with hybrid automatic repeat request acknowledgement (HARQ-ACK) information on the PUCCH cell in the PUCCH group based on the bit field.

11. The base station of claim 10,
wherein a size of the bit field is 1 bit,
wherein the bit field with a value '0' indicates a primary cell as the PUCCH cell in the PUCCH group to transmit the PUCCH with HARQ-ACK information, and
wherein the bit field with a value '1' indicates the secondary cell corresponding to the index as the PUCCH cell in the PUCCH group to transmit the PUCCH with HARQ-ACK information.

12. The base station of claim 10, wherein the secondary cell is associated with time domain duplex (TDD).

* * * * *